United States Patent
Doi et al.

(10) Patent No.: US 7,255,936 B2
(45) Date of Patent: *Aug. 14, 2007

(54) POLYMERIC FLUORESCENT SUBSTANCE AND POLYMER LIGHT-EMITTING DEVICE USING THE SAME

(75) Inventors: Shuji Doi, Tsukuba (JP); Takanobu Noguchi, Tsukuba (JP); Yoshiaki Tsubata, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 10/206,880

(22) Filed: Jul. 29, 2002

(65) Prior Publication Data

US 2003/0064247 A1    Apr. 3, 2003

(30) Foreign Application Priority Data

Jul. 30, 2001 (JP) .................. 2001-229306

(51) Int. Cl.
*H01L 51/54* (2006.01)
*C09K 11/06* (2006.01)

(52) U.S. Cl. .......... 428/690; 428/917; 313/504; 313/506; 257/40; 252/301.35

(58) Field of Classification Search .......... 428/690, 428/917; 313/504, 506; 257/40; 252/301.35
See application file for complete search history.

(56) References Cited

U.S. PATENT DOCUMENTS

| | | | | |
|---|---|---|---|---|
| 5,543,079 A * | 8/1996 | Ohnishi et al. | ........ | 252/301.35 |
| 5,814,244 A * | 9/1998 | Kreuder et al. | ........ | 252/301.16 |
| 5,821,002 A * | 10/1998 | Ohnishi et al. | ............ | 428/690 |
| 5,972,247 A * | 10/1999 | Shi et al. | ............ | 252/583 |
| 6,107,452 A | 8/2000 | Miller et al. | | |
| 6,150,043 A * | 11/2000 | Thompson et al. | ......... | 428/690 |
| 6,255,449 B1 | 7/2001 | Woo et al. | | |
| 6,414,104 B1 * | 7/2002 | Pei | ............ | 528/86 |
| 6,489,045 B1 * | 12/2002 | Araki et al. | ............ | 428/690 |
| 2002/0185635 A1 * | 12/2002 | Doi et al. | .......... | 252/582 |

FOREIGN PATENT DOCUMENTS

| | | |
|---|---|---|
| WO | WO 99/54385 A1 | 10/1999 |
| WO | WO 00/46321 A1 | 8/2000 |
| WO | WO 00/55927 A1 | 9/2000 |
| WO | WO 01/62822 A1 | 8/2001 |

OTHER PUBLICATIONS

Bernius M., Inbasekaran, M., Woo, E., Wu, W. Wujowski, L., "Light-emitting diodes based on fluoene polymers", Thin Solid Films, vol. 363, 2000, pp. 55-57.

* cited by examiner

*Primary Examiner*—Rena Dye
*Assistant Examiner*—Carrie S. Thompson
(74) *Attorney, Agent, or Firm*—Sughrue Mion, PLLC

(57) ABSTRACT

Provided is a polymeric fluorescent substance comprising a copolymer which has a substituent containing a specific aromatic amine structure below in the side chain,

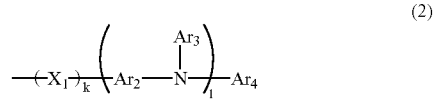

(2)

wherein $X_1$ is a divalent hydrocarbon group; $Ar_2$ is an arylene group or the like; $Ar_3$ and $Ar_4$ independently represent an aryl group or the like. The polymeric fluorescent substance is preferably used for a light emitting layer of a polymer LED having high luminance and high light emitting efficiency.

27 Claims, No Drawings

POLYMERIC FLUORESCENT SUBSTANCE AND POLYMER LIGHT-EMITTING DEVICE USING THE SAME

BACKGROUND OF THE INVENTION

1. Field of the Invention

The present invention relates to a polymeric fluorescent substance and a polymer light-emitting device (hereinafter, sometimes referred to as polymer LED) using the same.

2. Description of the Related Art

Unlike with low molecular weight light-emitting materials, polymeric light-emitting materials (polymeric fluorescent substance) are soluble in a solvent, and can form a light-emitting layer in a light emitting device by a coating method, consequently, have been variously investigated. In recent years, polymeric fluorescent substances having a fluorene unit attract attention, and in order to improve the performance, copolymers comprising a fluorene unit and other unit have been studied.

Among the above copolymers, a copolymer comprising an aromatic amine structure (hereinafter, may be referred to as aromatic amine unit) as other unit is disclosed, for example, a polymeric fluorescent substance comprising a copolymer which comprises a fluorene unit and an aromatic amine unit having a nitrogen atom in the main chain (WO 99/54385).

However, the above known polymeric fluorescent substance comprising a fluorene unit and an aromatic amine unit having a nitrogen atom in the main chain has a problem that luminance and light emitting efficiency are not yet sufficient, when the polymeric fluorescent substance is used as a light emitting layer.

An object of the present invention is to provide a polymeric fluorescent substance comprising a copolymer which has a substituent containing a specific aromatic amine structure in the side chain, and when said polymeric fluorescent substance is used for a light emitting layer, high luminance and high light emitting efficiency are attained, and to provide a polymer LED using the polymeric fluorescent substance.

SUMMARY OF THE INVENTION

Namely, the present invention relates to a polymeric fluorescent substance exhibiting fluorescence in the solid state and having a polystyrene reduced number average molecular weight of $10^3$ to $10^8$, which comprises one or more repeating units represented by formula (1) and one or more repeating units represented by formula (3), $$—Ar_1— \quad (1)$$

wherein $Ar_1$ represents an arylene group or a divalent heterocyclic compound group and has 1 to 4 substituents represented by following formula (2),

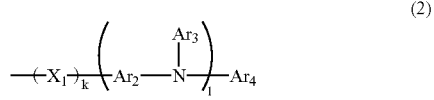

(2)

wherein $X_1$ represents a divalent hydrocarbon group; $Ar_2$ represents an arylene group or a divalent heterocyclic compound group; $Ar_3$ represents an aryl group or a monovalent heterocyclic compound group; $Ar_2$ and $Ar_3$ may be mutually connected to form a ring; $Ar_4$ represents an aryl group or a monovalent heterocyclic compound group; $Ar_3$ and $Ar_4$ may be mutually connected to form a ring; k is 0 or 1; l represents an integer of 1 to 3, $$—Ar_5— \quad (3)$$

wherein $Ar_5$ represents an arylene group or divalent heterocyclic compound group represented by formula (4) or

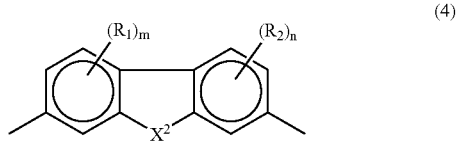

(4)

wherein $X_2$ represents a group selected from O, S, SO, $SO_2$, N—$R_3$, $CR_4R_5$, $SiR_6R_7$; $R_3$ to $R_7$ each independently represent a group selected from a hydrogen atom, alkyl group, aryl group and monovalent heterocyclic compound group; $R_1$ and $R_2$ each independently represent a group selected from alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group and cyano group; m and n are each independently integers of 0 to 3; when m is two or more, a plurality of $R_1$ may be the same or different; when n is two or more, a plurality of $R_2$ may be the same or different; $R_1$ to $R_7$ may be connected to form a ring; when $R_1$ to $R_7$ is a group containing an alkyl chain, the alkyl chain may be interrupted by a group containing a hetero atom,

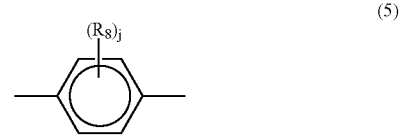

(5)

wherein $R_8$ represents a group selected from alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group and cyano group; j is an integer of 0 to 3; when j is two or more, a plurality of $R_8$ may be the same or different; when $R_8$ is a group containing an alkyl chain, the alkyl chain may be interrupted by a group containing a hetero atom.

Further, the present invention relates to a polymer light-emitting device comprising a pair of electrodes composed of an anode and a cathode at least one of which is transparent or semitransparent and at least containing an light emitting layer between the electrodes, wherein the light emitting layer comprises the above polymeric fluorescent substance.

DETAILED DESCRIPTION OF THE INVENTION

The polymeric fluorescent substance of the present invention exhibits fluorescence in the solid state, and has a polystyrene reduced number average molecular weights of $10^3$ to $10^8$. The polymeric fluorescent substance comprises repeating units represented by the above formulas (1) and (3), respectively.

The total amount of the repeating unit represented by formulas (1) and (3) is suitably 50% by mole or more based on all the repeating units. Moreover, the total amount of the repeating unit represented by formula (1) is suitably 0.1% by mole or more and 50% by mole or less based on the total amount of the repeating unit represented by formulas (1) and (3). More suitably, the total amount of the repeating unit represented by formulas (1) and (3) is 50% by mole or more based on all the repeating units, and the total amount of the repeating unit represented by formula (1) is 0.1% by mole or more and 50% by mole or less based on the total amount of the repeating unit represented by formulas (1) and (3).

The repeating unit represented by the above formula (1) is an arylene group or divalent heterocyclic compound group having 1 to 4 substituents represented by the above formula (2).

The repeating unit represented by the above formula (3) is a divalent compound group represented by formula (4) or (5). The repeating unit represented by the above formula (4) is a biphenylene group bridging between two benzene rings, which may have a substituent. The repeating unit represented by the above formula (5) is a phenylene group which may have a substituent. As a repeating unit represented by formula (5), specifically exemplified is a repeating unit of formula (6) which is a fluorene-2,7-diyl group.

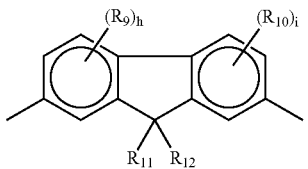

(6)

wherein $R_{11}$ and $R_{12}$ each independently represent a group selected from a hydrogen atom, alkyl group, aryl group and monovalent heterocyclic compound group; $R_9$ and $R_{10}$ each independently represent a group selected from alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group and cyano group; h and i are each independently integers of 0 to 3; when h is two or more, a plurality of $R_9$ may be the same or different; when i is two or more, a plurality of $R_{10}$ may be the same or different; $R_9$ to $R_{12}$ may be connected to form a ring; when $R_9$ to $R_{12}$ is a group containing an alkyl chain, the alkyl chain may be interrupted by a group containing a hetero atom.

The arylene group is an atomic group of an aromatic hydrocarbon in which two hydrogen atoms are removed. The aromatic hydrocarbon is a hydrocarbon used as a matrix of an aromatic compound, which contains a benzene ring. The aromatic hydrocarbon also includes those containing a condensed ring, and two or more of independent benzene rings or condensed rings bonded through a group such as a direct bond, a vinylene group or the like.

The arylene group usually has 6 to 60 carbon atoms, and examples thereof include phenylene group, biphenylene group, terphenylene group, fluorene diyl group, naphthalenediyl group, anthracenediyl group, etc. Here, the number of carbon atoms of the substituent is not counted as the number of carbon atoms of the arylene group.

The divalent heterocyclic compound group means an atomic group of a heterocyclic compound in which two hydrogen atoms are removed. The heterocyclic compound means an organic compound having a cyclic structure in which at least one heteroatom such as oxygen, sulfur, nitrogen, phosphorus, boron, etc. is contained in the cyclic structure as the element other than carbon atoms.

The divalent heterocyclic compound group usually has 4 to 60 carbon atoms, and examples thereof include furandiyl group, thienylene group, fluorenediyl group, pyridinediyl group, pyrimidinediyl group, quinolinediyl group, quinoxalinediyl group, etc. Here, the number of carbon atoms of the substituent is not counted as the number of carbon atoms of the divalent heterocyclic compound group.

As the examples of $Ar_1$, groups having a structure obtained by combination of two or more of the above arylene groups and divalent heterocyclic compound groups may be included.

Among them, phenylene group, biphenylene group, naphthalenediyl group, anthracenediyl group, pyridinediyl group, thienylene group, quinolinediyl group, and quinoxaline diyl group are more suitable.

$Ar_1$ has 1 to 4, preferably 1 to 2 substituents represented by the above formula (2).

$Ar_1$ may have a substituent other than the substituent represented by the above formula (2). As the substituent other than the substituent represented by the above formula (2), exemplified are alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group, cyano group, etc. As the concrete examples, exemplified are the same groups with those of $R_1$ and $R_2$ mentioned later.

$X_1$ in the above formula (2) means a divalent hydrocarbon group. The divalent hydrocarbon group is an atomic group of a hydrocarbon in which two hydrogen atoms are removed, and usually has about 1 to 20 carbon atoms. Specifically, alkylene group, alkenylene group, alkynylene group, and polymethylene group are exemplified. More specifically, methylene group, ethylene group, propylene group, ethenylene group, ethynylene group, substituted ethenylene group, trimethylene group, tetramethylene group, etc. are exemplified. Among them, ethenylene group and substituted ethenylene group are more suitable.

As the substituted ethenylene group, exemplified are ethenylene groups having methyl group, ethyl group, phenyl group or cyano group as the substituent.

$Ar_2$ of the above formula (2) is an arylene group or a divalent heterocyclic compound group. Definition of the arylene group and the divalent heterocyclic compound group is the same with that of $Ar_1$, and the concrete and preferable examples are the same as those described about $Ar_1$.

$Ar_3$ and $Ar_4$ in the above formula (2) are each independently an aryl group or a monovalent heterocyclic compound group.

The aryl group usually has 6 to 60 carbon atoms, and examples thereof include phenyl group, biphenyl group, terphenyl group, fluorenyl group, naphtyl group, anthryl group, and groups thereof having a substituent.

The monovalent heterocyclic compound group usually has 4 to 60 carbon atoms, and examples thereof include pyridinyl group, pyrimidinyl group, furanyl group, thienyl group, quinolinyl group, quinoxalinyl group, and groups thereof having a substituent.

Among them, phenyl group, naphtyl group, anthryl group, pyridinyl group, thienyl group, quinolinyl group, quinoxalinyl group, and groups thereof having a substituent are more suitable. When $Ar_3$ and $Ar_4$ have a substituent, examples of the substituent include alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group, and cyano group.

$Ar_2$ and $Ar_3$ may be mutually connected with a single bond or a divalent hydrocarbon group. The divalent hydrocarbon group which connects $Ar_2$ and $Ar_3$ mutually has usually about one to 20 carbon atoms. Specifically, alkylene group, alkenylene group, alkynylene group, and polymethylene group are exemplified. More specifically, methylene group, ethylene group, propylene group, ethenylene group, ethynylene group, etc. are exemplified. Among them, a single bond, methylene group, and ethenylene group are preferable.

As the group having a structure in which $Ar_2$ and $Ar_3$ are mutually connected with a single bond or a divalent hydrocarbon group, exemplified are carbazolyl group and substituted carbazolyl group. As the substituent of substituted carbazolyl group, exemplified are alkyl group, alkoxy group, alkylthio group, alkylsilyl group, alkylamino group, aryl group, aryloxy group, arylsilyl group, aryl amino group, arylalkyl group, arylalkoxy group, arylalkylsilyl group, arylalkylamino group, arylalkenyl group, arylalkynyl group, monovalent heterocyclic compound group, and cyano group.

$Ar_3$ and $Ar_4$ may be mutually connected as the same manner with the above case of $Ar_2$ and $Ar_3$.

As the example represented by formula (2), exemplified are those shown below. Further exemplified are groups thereof having, on their benzene ring, one or more substituents such as alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group and cyano group. Also exemplified are groups thereof having, on their ethenyl group, a substituent such as alkyl group, aryl group and arylalkyl group.

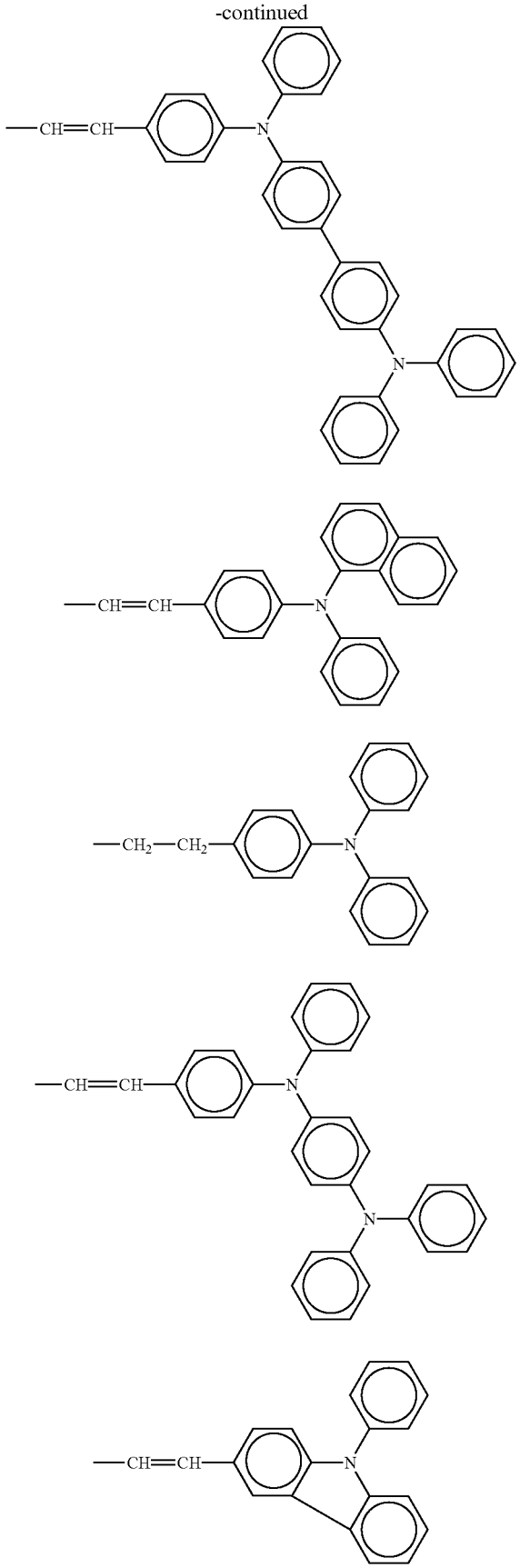

-continued

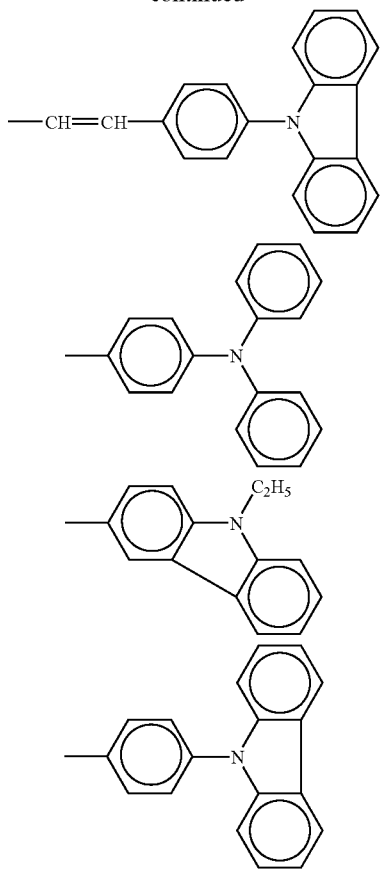

Among them, the groups shown below are preferable.

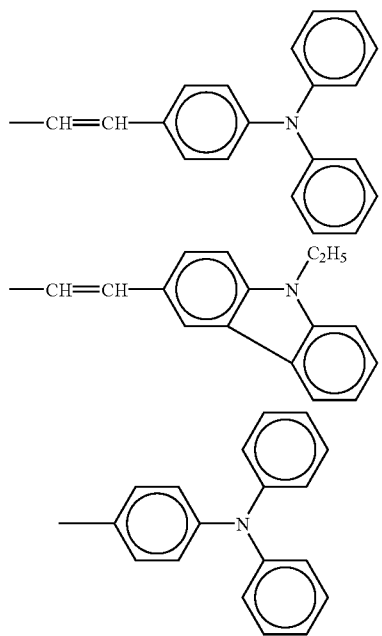

In the repeating unit represented by formula (1), $Ar_1$ is preferably 1,4-phenylene group, and more preferably, 1,4-phenylene group having one or two substituents represented by formula (2). Among the groups having two substituents represented by formula (2), 1,4-phenylene group having two substituents at 2,5-positions is further preferable.

The repeating unit represented by the above formula (3) is a divalent compound group represented by formula (4), (5) or (6).

$R_1$ and $R_2$ in formula (4), $R_8$ in formula (5) and, $R_9$ and $R_{10}$ in formula (6) each independently represent a group selected from alkyl group, alkoxy group, alkylthio group, alkyl silyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group, and cyano group.

$R_1$ and $R_2$ in the repeating unit represented by the above formula (4), $R_8$ in the repeating unit represented by the above formula (5) and $R_9$ and $R_{10}$ in the repeating unit represented by the above formula (6) are described as follows when they are substituents other than cyano group.

The alkyl group may be any of linear, branched or cyclic, and usually has about 1 to 20 carbon atoms, and specific examples thereof include a methyl group, ethyl group, propyl group, i-propyl group, butyl group, i-butyl group, t-butyl group, pentyl group, isoamyl group, hexyl group, cyclohexyl group, heptyl group, octyl group, 2-ethylhexyl group, nonyl group, decyl group, 3,7-dimethyloctyl group, lauryl group and the like, and preferable are a pentyl group, isoamyl group, hexyl group, octyl group, 2-ethylhexyl group, decyl group and 3,7-dimethyloctyl group.

The alkoxy group may be any of linear, branched or cyclic, and the number of carbon atoms is usually from 1 to 20, and specific examples thereof include a methoxy group, ethoxy group, propyloxy group, i-propyloxy group, butoxy group, i-butoxy group, t-butoxy group, pentyloxy group, isoamyloxy group, hexyloxy group, cyclohexyloxy group, heptyloxy group, octyloxy group, 2-ethylhexyloxy group, nonyloxy group, decyloxy group, 3,7-dimethyloctyloxy group, lauryloxy group and the like, and preferable are a pentyloxy group, isoamyloxy group, hexyloxy group, octyloxy group, 2-ethylhexyloxy group, decyloxy group and 3,7-dimethyloctyloxy group.

The alkylthio group may be any of linear, branched or cyclic, and usually has about 1 to 20 carbon atoms, and specific examples thereof include a methylthio group, ethylthio group, propylthio group, i-propylthio group, butylthio group, i-butylthio group, t-butylthio group, pentylthio group, isoamylthio group, hexylthio group, cyclohexylthio group, heptylthio group, octylthio group, 2-ethylhexylthio group, nonylthio group, decylthio group, 3,7-dimethyloctylthio group, laurylthio group and the like, and preferable are a pentylthio group, isoamylthio group, hexylthio group, octylthio group, 2-ethylhexylthio group, decylthio group and 3,7-dimethyloctylthio group.

The alkylsilyl group may be any of linear, branched or cyclic, and usually has about 1 to 60 carbon atoms, and specific examples thereof include a methylsilyl group, ethylsilyl group, propylsilyl group, i-propylsilyl group, butylsilyl group, i-butylsilyl group, t-butylsilyl group, pentylsilyl group, isoamylsilyl group, hexylsilyl group, cyclohexylsilyl group, heptylsilyl group, octylsilyl group, 2-ethylhexylsilyl group, nonylsilyl group, decylsilyl group, 3,7-dimethyloctylsilyl group, laurylsilyl group, trimethylsilyl group, ethyldimethylsilyl group, propyldimethylsilyl group, i-propyldimethylsilyl group, butyldimethylsilyl group, t-butyldimethylsilyl group, pentyldimethylsilyl group, isoamyldimethylsilyl group, hexyldimethylsilyl group, heptyldimethylsilyl group, octyldimethylsilyl group, 2-ethylhexyl-dimethylsilyl group, nonyldimethylsilyl group, decyldimethylsilyl group, 3,7-dimethyloctyl-dimethylsilyl group, lauryldimethylsilyl group and the like, and preferable are a pentylsilyl group, isoamylsilyl group, hexylsilyl group, octylsilyl group, 2-ethylhexylsilyl group, decylsilyl group, 3,7-dimethyloctylsilyl group, pentyldimethylsilyl group, isoamyldimethylsilyl group, hexyldimethylsilyl group, octyldimethylsilyl group, 2-ethylhexyl-dimethylsilyl group, decyldimethylsilyl group and 3,7-dimethyloctyl-dimethylsilyl group.

The alkylamino group may be any of linear, branched or cyclic, may be a monoalkyl group or a dialkylamino group, and usually has about 1 to 40 carbon atoms, and specific examples thereof include a methylamino group, dimethylamino group, ethylamino group, diethylamino group, propylamino group, i-propylamino group, butylamino group, i-butylamino group, t-butylamino group, pentylamino group, isoamylamino group, hexylamino group, cyclohexylamino group, heptylamino group, octylamino group, 2-ethylhexylamino group, nonylamino group, decylamino group, 3,7-dimethyloctylamino group, laurylamino group and the like, and preferable are a pentylamino group, isoamylamino group, hexylamino group, octylamino group, 2-ethylhexylamino group, decylamino group and 3,7-dimethyloctylamino group.

The aryl group usually has about 6 to 60 carbon atoms, and specific examples thereof include a phenyl group, $C_1$ to $C_{12}$ alkoxyphenyl groups ($C_1$ to $C_{12}$ indicates 1 to 12 carbon atoms, the same in the following), $C_1$ to $C_{12}$ alkylphenyl groups, 1-naphthyl group, 2-naphthyl group and the like, and preferable are $C_1$ to $C_{12}$ alkoxyphenyl groups and $C_1$ to $C_{12}$ alkylphenyl groups.

The aryloxy group usually has about 6 to 60 carbon atoms, and specifically, a phenoxy group, $C_1$ to $C_{12}$ alkoxyphenoxy groups, $C_1$ to $C_{12}$ alkylphenoxy groups, 1-naphthyloxy group, 2-naphthyloxy and the like are exemplified, and preferable are a phenoxy group, $C_1$ to $C_{12}$ alkoxyphenoxy groups and $C_1$ to $C_{12}$ alkylphenoxy groups.

The arylsilyl group usually has about six to 60 carbon atoms, and exemplified are phenylsilyl group, $C_1$ to $C_{12}$ alkoxyphenylsilyl group, $C_1$ to $C_{12}$ alkylphenylsilyl group, 1-naphtylsilyl group, 2-naphtylsilyl group, dimethylphenylsilyl group, etc. $C_1$ to $C_{12}$ alkoxy phenyl silyl group and $C_1$ to $C_{12}$ alkyl phenyl silyl group are preferable.

The arylamino group usually has about 6 to 60 carbon atoms, and specific examples thereof include a phenylamino group, diphenylamino group, $C_1$ to $C_{12}$ alkoxyphenylamino groups, di($C_1$ to $C_{12}$ alkoxyphenyl)amino groups, di($C_1$ to $C_{12}$ alkylphenyl)amino groups, 1-naphthylamino group, 2-naphthylamino group, and the like, and preferable are $C_1$ to $C_{12}$ alkylphenylamino groups and di($C_1$ to $C_{12}$ alkylphenyl)amino groups.

The arylalkyl group usually has about seven to 60 carbon atoms. Specifically, phenyl-$C_1$ to $C_{12}$ alkyl group, $C_1$ to $C_{12}$ alkoxyphenyl-$C_1$ to $C_{12}$ alkyl group, $C_1$ to $C_{12}$ alkylphenyl-$C_1$ to $C_{12}$ alkyl group, 1-naphtyl-$C_1$ to $C_{12}$ alkyl group, 2-naphtyl-$C_1$ to $C_{12}$ alkyl group, etc. are exemplified, and $C_1$ to $C_{12}$ alkoxy phenyl-$C_1$ to $C_{12}$ alkyl group, and $C_1$ to $C_{12}$ alkyl phenyl-$C_1$ to $C_{12}$ alkyl group are preferable.

The arylalkoxy group usually has about 7 to 60 carbon atoms, and specifically, phenyl-$C_1$ to $C_{12}$ alkoxy groups, $C_1$ to $C_{12}$ alkoxyphenyl-$C_1$ to $C_{12}$ alkoxy groups, $C_1$ to $C_{12}$ alkylphenyl-$C_1$ to $C_{12}$ alkoxy groups, 1-naphtyl-$C_1$ to $C_{12}$ alkoxy groups, 2-naphtyl-$C_1$ to $C_{12}$ alkoxy groups and the like are exemplified, and preferable are $C_1$ to $C_{12}$ alkoxyphenyl-$C_1$ to $C_{12}$ alkoxy groups and $C_1$ to $C_{12}$ alkylphenyl-$C_1$ to $C_{12}$ alkoxy groups.

The arylalkylsilyl group usually has about 7 to 60 carbon atoms. Specifically, phenyl-$C_1$ to $C_{12}$ alkylsilyl group, $C_1$ to $C_{12}$ alkoxyphenyl-$C_1$ to $C_{12}$ alkylsilyl group, $C_1$ to $C_{12}$ alkylphenyl-$C_1$ to $C_{12}$ alkylsilyl group, 1-naphtyl-$C_1$ to $C_{12}$ alkylsilyl group, 2-naphtyl-$C_1$ to $C_{12}$ alkylsilyl group, phenyl-$C_1$ to $C_{12}$ alkyldimethylsilyl group, etc. are exemplified, and $C_1$ to $C_{12}$ alkoxyphenyl-$C_1$ to $C_{12}$ alkylsilyl group, and $C_1$ to $C_{12}$ alkylphenyl-$C_1$ to $C_{12}$ alkylsilyl group are preferable.

The arylalkylamino group has about 7 to 60 carbon atoms. Specifically Phenyl-$C_1$ to $C_{12}$ alkylamino group, $C_1$ to $C_{12}$ alkoxyphenyl-$C_1$ to $C_{12}$ alkylamino group, $C_1$ to $C_{12}$ alkylphenyl-$C_1$ to $C_{12}$ alkylamino group, di($C_1$ to $C_{12}$ alkoxyphenyl-$C_1$ to $C_{12}$ alkyl)amino group, di($C_1$ to $C_{12}$ alkylphenyl-$C_1$ to $C_{12}$ alkyl)amino group, 1-naphtyl-$C_1$ to $C_{12}$ alkylamino group, 2-naphtyl-$C_1$ to $C_{12}$ alkylamino group, etc. are exemplified, and $C_1$ to $C_{12}$ alkylphenyl-$C_1$ to $C_{12}$ alkylamino group, and di($C_1$ to $C_{12}$ alkylphenyl-$C_1$ to $C_{12}$ alkyl)amino group are preferable.

The monovalent heterocyclic compound group means a remaining atomic group obtained by removing one hydrogen atom from a heterocyclic compound, and the number of carbon atoms is usually from about 4 to 60, preferably from 4 to 20. The number of carbon atoms of a heterocyclic compound group does not include the number of carbon atoms of a substituent. Here, the term heterocyclic compound includes organic compounds having a cyclic structure in which elements constituting a ring is not composed only of a carbon atom but also hetero atoms such as oxygen, sulfur, nitrogen, phosphorus, boron and the like are contained in the ring. Specifically, a thienyl group, $C_1$ to $C_{12}$ alkylthienyl groups, pyrrolyl group, furyl group, pyridyl group, $C_1$ to $C_{12}$ alkylpyridyl groups and the like are exemplified, and preferable are a thienyl group, $C_1$ to $C_{12}$ alkylthienyl groups, pyridyl group are $C_1$ to $C_{12}$ alkylpyridyl groups.

$R_3$ to $R_7$ in the repeating unit represented by the above formula (4), and $R_{11}$ and $R_{12}$ in the repeating unit represented by the above formula (6) each independently represent a group selected from a hydrogen atom, alkyl group, aryl group and monovalent heterocyclic compound group.

$R_3$ to $R_7$ in $X_2$ of formula (4), and $R_{11}$ and $R_{12}$ in formula (6) are described as follows when they are substituents other than a hydrogen atom.

The alkyl group may be any of linear, branched or cyclic, and usually has about 1 to 20 carbon atoms, and specific examples thereof include a methyl group, ethyl group, propyl group, i-propyl group, butyl group, i-butyl group, t-butyl group, pentyl group, isoamyl group, hexyl group, cyclohexyl group, heptyl group, octyl group, 2-ethylhexyl group, nonyl group, decyl group, 3,7-dimethyloctyl group, lauryl group and the like, and preferable are a pentyl group, isoamyl group, hexyl group, octyl group, 2-ethylhexyl group, decyl group and 3,7-dimethyloctyl group.

The aryl group usually has about 6 to 60 carbon atoms, and specific examples thereof include a phenyl group, $C_1$ to $C_{12}$ alkoxyphenyl groups ($C_1$ to $C_{12}$ indicates 1 to 12 carbon atoms, the same in the following), $C_1$ to $C_{12}$ alkylphenyl groups, 1-naphthyl group, 2-naphthyl group and the like, and preferable are $C_1$ to $C_{12}$ alkoxyphenyl groups and $C_1$ to $C_{12}$ alkylphenyl groups.

The monovalent heterocyclic compound group usually has the carbon atoms from about 4 to 60, and exemplified, specifically, a thienyl group, $C_1$ to $C_{12}$ alkylthienyl groups, pyrrolyl group, furyl group, pyridyl group, $C_1$ to $C_{12}$ alkylpyridyl groups and the like, and preferable are a thienyl group, $C_1$ to $C_{12}$ alkylthienyl groups, pyridyl group are $C_1$ to $C_{12}$ alkylpyridyl groups.

In the repeating unit represented by the above formula (4), m and n are each independently an integer of 0 to 3. When m is two or more, a plurality of $R_1$ is the same or different. When n is two or more, a plurality of $R_2$ is the same or different. Any two of $R_1$ to $R_7$ may be connected to form a ring. Furthermore, when $R_1$ to $R_7$ is a group containing an alkyl chain, the alkyl chain may be interrupted by a group containing a hetero atom.

In the repeating unit represented by the above formula (5), j is an integer of 1 to 4. When j is two or more, a plurality of $R_8$ is the same or different. When j is two or more, any two of $R_8$ may be connected to form a ring. Furthermore, when $R_8$ is a group containing an alkyl chain, the alkyl chain may be interrupted by a group containing a hetero atom.

In the repeating unit represented by the above formula (6), h and i are each independently an integer of 0 to 3. When h is two or more, a plurality of $R_9$ is the same or different. When i is two or more, a plurality of $R_{10}$ is the same or different. Any two of $R_9$ to $R_{12}$ may be connected to form a ring. Furthermore, when $R_9$ to $R_{12}$ is a group containing an alkyl chain, the alkyl chain may be interrupted by a group containing a hetero atom. Here, as the hetero atom, oxygen atom, sulfur atom, nitrogen atom, etc. are exemplified.

Examples of the group containing a hetero atom include following groups.

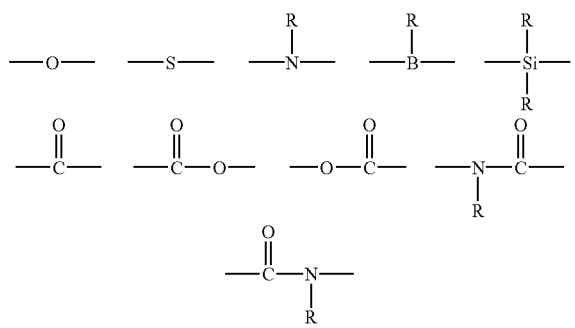

Here, R means a hydrogen atom, alkyl group having 1 to 20 carbon atoms, aryl group having 6 to 60 carbon atoms, and heterocyclic compound group having 4 to 60 carbon atoms.

The substituent containing an alkyl chain may be any one of linear, branched and cyclic, or combination thereof, and as the examples of not linear, exemplified are isoamyl group, 2-ethylhexyl group, 3,7-dimethyloctyl group, cyclohexyl group, 4-$C_1$ to $C_{12}$ alkylcyclohexyl group, etc. In order to improve the solubility of the polymeric fluorescent substance in a solvent, it is suitable that at least one of the substituents in the above formula (1) contains a cyclic or branched alkyl chain.

In order to obtain a material of strong fluorescence, it is suitable that there is little symmetry in the form of the repeating unit including substituent.

Furthermore, when $R_1$ to $R_{12}$ are those including an aryl group or a heterocyclic compound group as a part of the structure, they may have further one or more substituents.

Since light emitting property and life time as a device may be deteriorated when a polymerizable group remains as an end group of the polymeric fluorescent substance, the end group may be protected by a stable group. Those having a conjugation bond continuing to a conjugated structure of the main chain are preferable, and exemplified are structures connecting to an aryl group or a heterocyclic compound group through a vinylene group. Concretely, substituents represented by Chemical Formula 10 described in JP-A No. 9-45478, and the like are exemplified.

Method for synthesizing the polymeric fluorescent substance include a polymerization method by Suzuki coupling reaction from the corresponding monomer, a polymerization method by Grignard reaction, a polymerization method by using nickel (0) catalyst, a polymerization method by using an oxidizing agent such as $FeCl_3$, etc., a method by electrochemical oxidative polymerization, and a method by decomposition of an intermediate polymer having suitable leaving group. Among them, in view of easiness of the reaction control, the polymerization method by Suzuki coupling reaction, the polymerization method by Grignard reaction, and the polymerization method by using nickel (0) catalyst are preferable.

This polymeric fluorescent substance may contain other repeating unit than the repeating unit of formulae (1) and (3) in the range wherein luminescent property and charge transport property do not deteriorate. The repeating unit of formulae (1) and (3) or other unit than the repeating unit of formulae (1) and (3) may be connected via a non-conjugated unit, or such non-conjugated part may also contained in the repeating unit. As the linkage structure, there are exemplified those shown in the following chemical formula, combinations of those shown in the following chemical formula with a vinylene group, combinations of two or more of those shown in the following chemical formula, and the like.

Here, R is selected from the same substituents as described above, and Ar represents a hydrocarbon group having 6 to 60 carbon atoms.

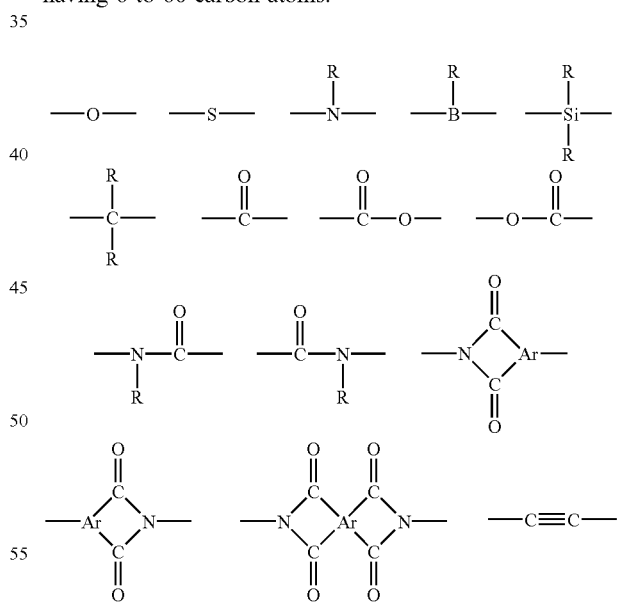

This polymeric fluorescent substance may also be a random, block or graft copolymer, or a polymer having an intermediate structure thereof, for example, a random copolymer having blocking property.

From the viewpoint for obtaining a polymeric fluorescent substance having high fluorescent quantum yield, the repeating regularity is preferably lower, and example, a random copolymer is more preferable than an alternating copolymer. In order to obtain an alternating copolymer, it is necessary to use monomers each having two kind of active groups for polymerization. On the other hand, a random copolymer can be obtained by charging a plurality of monomers having one kind of active group in a desired ratio, and the preparation is easily conducted. Further, a random copolymer having a block property and a block copolymer composed of blocks of ununiform sizes, or a graft copolymer, are more preferable than a complete random copolymer. Polymers of branching in the main chain and of three or more terminals are also included. Further, a dendrimer grown regularly and a structure containing random branching are also included.

Further, as the polymeric fluorescent substance, those emitting fluorescence in a solid state are suitably used, since the material utilizes light emission from a thin film.

As good solvents for the polymeric fluorescent substance, there are exemplified chloroform, methylene chloride, dichloroethane, tetrahydrofuran, toluene, xylene, mesitylene, tetralin, decalin, n-butylbenzene and the like. The polymeric fluorescent substance can be usually dissolved in these solvents in an amount of 0.1 wt % or more, though the amount differs depending on the structure and molecular weight of the polymeric fluorescent substance.

The polymeric fluorescent substance has a number-average molecular weight of $10^3$ to $10^8$ in terms of polystyrene, and the degree of polymerization thereof also changes depending on repeating structures and proportion thereof. From the standpoint of film forming property, generally the total amount of repeating structures is preferably from 20 to 10000, more preferably from 30 to 10000, particularly preferably from 50 to 5000.

When these polymeric fluorescent substances are used as a light emitting material of a polymer LED, the purity thereof exerts an influence on light emitting property, therefore, it is preferable that a monomer before polymerization is purified by a method such as distillation, sublimation purification, re-crystallization and the like before being polymerized and further, it is preferable to conduct a purification treatment such as re-precipitation purification, chromatographic separation and the like after the synthesis.

The polymeric fluorescent substance of the present invention can be used not only as a light emitting material, but also as an organic semiconductor material, optical material, or as conductive material by doping.

A method of producing a polymeric fluorescent substance of the present invention will be described below.

As the method of producing a polymeric fluorescent substance of the present invention, for example, a method described in JP-A No. 5-202355 is mentioned, when a vinylene group is contained in the main chain. Namely, there are exemplified methods such as polymerization of a compound having an aldehyde group with a compound having a phosphonium salt group, or of a compound having an aldehyde group and a phosphonium salt group, according to a Wittig reaction, polymerization of a compound having a vinyl group with a compound having a halogen group, or of a compound having a vinyl group and a halogen group, according to a Heck reaction, polymerization of a compound having an aldehyde group with a compound having an alkylphosphonate group, or of a compound having an aldehyde group and an alkylphosphonate group, according to a Horner-Wadsworth-Emmons reaction, polycondensation of a compound having two or more halogenated methyl groups, according to a de-hydrohalogenating method, polycondensation of a compound having two or more sulfonium salt groups, according to a sulfonium salt-decomposing method, polymerization of a compound having an aldehyde group with a compound having an acetonitrile group, or of a compound having an aldehyde group and an acetonitrile group, according to a Knoevenagel reaction, polymerization of a compound having two or more aldehyde groups, according to McMurry reaction, and the like.

When a vinylene group is not contained in the main chain, for example, a method of polymerization from corresponding monomers by a Suzuki coupling reaction, a method of polymerization by a Grignard reaction, a method of polymerization using a Ni(0) catalyst, a method of polymerization using an oxidizer such as $FeCl_3$ and the like, a method of oxidation polymerization electrochemically, a method of decomposition of an intermediate polymer having a suitable releasing group, and the like are exemplified.

Of these, the polymerization method by a Wittig reaction, the polymerization method by a Heck reaction, the polymerization method by a Horner-Wadsworth-Emmons method, the polymerization method by a Knoevenagel reaction, the polymerization method by a Suzuki coupling reaction, the polymerization method by a Grignard reaction and the polymerization method using a Ni(0) catalyst are preferable since structure control is easy in these methods.

Specifically, a compound used as a monomer, having a plurality of reactive substituents is dissolved, if necessary, in an organic solvent, and can be reacted at the melting temperature or more and the boiling point or less of the organic solvent using an alkali or suitable catalyst, for example. For example, known methods can be used, described in "Organic Reactions", vol. 14, pp. 270 to 490, John Wiley & Sons, Inc., 1965, "Organic Reactions", vol. 27, pp. 345 to 390, John Wiley & Sons, Inc., 1982, "Organic Synthesis", Collective Volume VI, pp. 407 to 411, John Wiley & Sons, Inc., 1988, Chemical Review, vol. 95, p. 2457 (1995), Journal of Organometallic Chemistry, vol. 576, p. 147 (1999), Journal of Praktical Chemistry, vol. 336, p. 247 (1994), Makromolecular Chemistry Macromolecular Symposium, vol. 12, p. 229 (1987), and the like.

It is preferable that the organic solvent used is subjected to a deoxygenation treatment sufficiently and the reaction is progressed under an inert atmosphere, generally for suppressing a side reaction, though the treatment differs depending on compounds and reactions used. Further, it is preferable to conduct a dehydration treatment likewise (however, this is not applicable in the case of a reaction in a two-phase system with water, such as a Suzuki coupling reaction).

For the reaction, an alkali or suitable catalyst is added appropriately. These may be selected according to the reaction used. It is preferable that the alkali or catalyst is soluble sufficiently in a solvent used for the reaction. As the method of mixing an alkali or catalyst, there is exemplified a method of adding a solution of an alkali or catalyst slowly while stirring under an inner atmosphere of argon and nitrogen and the like or a method of slowly adding the reaction solution to a solution of an alkali or catalyst, inversely.

More specifically, regarding the reaction conditions, in the cases of a Wittig reaction, Horner reaction, Knoevengel reaction and the like, an alkali in an amount of equivalent or more, preferably from 1 to 3 equivalent of based on the amount of functional groups of monomers is used and reacted. The alkali is not particularly restricted, and for example, metal alkolates such as potassium-t-butoxide, sodium-t-butoxide, sodium ethylate, lithium methylate and the like, hydride reagents such as sodium hydride and the like, amides such as sodiumamide and the like can be used. As the solvent, N,N-dimethylformamide, tetrahydrofuran, dioxane, toluene and the like are used. The reaction can be progressed at a reaction temperature of usually from room temperature to about 150° C. The reaction time is, for example, from 5 minutes to 40 hours, and time for sufficient progress of polymerization may be permissible, and since there is no necessity of leaving for a long period of time after completion of the reaction, the reaction time is preferably from 10 minutes to 24 hours. The concentration in the reaction may advantageously be selected appropriately within the range from about 0.01 wt % to the maximum solution concentration since when the concentration is too low, the reaction efficiency is poor and when too high, the reaction control is difficult, and the usual range is from 0.1 wt % to 20 wt %. In the case of a Heck reaction, monomers are reacted in the presence of a base such as triethylamine and the like, using a palladium catalyst. The reaction is effected at a reaction temperature of from about 80 to 160° C. for a reaction time of about 1 to 100 hours, using a solvent having relatively high boiling point such as N,N-dimethylformamide, N-methylpyrrolidone and the like.

In the case of a Suzuki coupling reaction, palladium [tetrakis(triphenylphosphine)], palladium acetates and the like are used, for example, as a catalyst, and an inorganic base such as potassium carbonate, sodium carbonate, barium hydroxide and the like, an organic base such as triethylamine and the like, and an inorganic salt such as cesium fluoride and the like, are added preferably in equivalent amount, preferably in an amount of 1 to 10 equivalent based on monomers, and reacted. It may be also permissible that an inorganic salt is used as an aqueous solution and reacted in a two-phase system. As the solvent, N,N-dimethylformamide, toluene, dimethoxyethane, tetrahydrofuran and the like are exemplified. Depending on the solvent, temperatures of 50 to 160° C. are preferably used. It may also be permissible that the temperature is raised near the boiling point of a solvent, to cause reflux. The reaction time is from about 1 to 200 hours.

In the case of a Grignard reaction, exemplified is a method in which a halide and metal Mg are reacted in an ether-based solvent such as tetrahydrofuran, diethyl ether, dimethoxyethane and the like to prepare a Grignard reagent which is mixed with a separately prepared monomer solution, and a nickel or palladium catalyst is added while paying attention to excess reaction, then, the reaction temperature is raised to reflux and the reaction is effected. The Grignard reagent is used in the equivalent amount, preferably in an amount of from 1 to 1.5 equivalent, more preferably from 1 to 1.2 equivalent, based on monomers. Also in the case of polymerization by other methods than those described above, the reaction can be effected by known methods.

Next, the polymer LED of the present invention will be described. Regarding the structure of the polymer LED of the present invention, a light-emitting layer is present between an anode and a cathode at least one of which is transparent or semi-transparent, and the polymeric fluorescent substance of the present invention is contained in the light-emitting layer.

As the polymer LED of the present invention, there are listed polymer LEDs having an electron transporting layer disposed between a cathode and a light emitting layer, polymer LEDs having a hole transporting layer disposed between an anode and a light emitting layer, polymer LEDs having an electron transporting layer disposed between a cathode and a light emitting layer and having a hole transporting layer disposed between an anode and a light emitting layer.

For example, the following structures a) to d) are specifically exemplified.

a) anode/light emitting layer/cathode b) anode/hole transporting layer/light emitting layer/cathode c) anode/light emitting layer/electron transporting layer/cathode d) anode/hole transporting layer/light emitting layer/electron transporting layer/cathode (wherein, / indicates adjacent lamination of layers. Hereinafter, the same)

Herein, the light emitting layer is a layer having function to emit a light, the hole transporting layer is a layer having function to transport a hole, and the electron transporting layer is a layer having function to transport an electron. Herein, the electron transporting layer and the hole transporting layer are generically called a charge transporting layer.

The light emitting layer, hole transporting layer and electron transporting layer may also each independently used in two or more layers.

Of charge transporting layers disposed adjacent to an electrode, that having function to improve charge injecting efficiency from the electrode and having effect to decrease driving voltage of an device are particularly called sometimes a charge injecting layer (hole injecting layer, electron injecting layer) in general.

For enhancing adherence with an electrode and improving charge injection from an electrode, the above-described charge injecting layer or insulation layer having a thickness of 2 nm or less may also be provided adjacent to an electrode, and further, for enhancing adherence of the interface, preventing mixing and the like, a thin buffer layer may also be inserted into the interface of a charge transporting layer and light emitting layer.

The order and number of layers laminated and the thickness of each layer can be appropriately applied while considering light emitting efficiency and life of the device.

In the present invention, as the polymer LED having a charge injecting layer (electron injecting layer, hole injecting layer) provided, there are listed a polymer LED having a charge injecting layer provided adjacent to a cathode and a polymer LED having a charge injecting layer provided adjacent to an anode.

For example, the following structures e) to p) are specifically exemplified.

e) anode/charge injecting layer/light emitting layer/cathode f) anode/light emitting layer/charge injecting layer/cathode g) anode/charge injecting layer/light emitting layer/charge injecting layer/cathode h) anode/charge injecting layer/hole transporting layer/light emitting layer/cathode i) anode/hole transporting layer/light emitting layer/charge injecting layer/cathode j) anode/charge injecting layer/hole transporting layer/light emitting layer/charge injecting layer/cathode k) anode/charge injecting layer/light emitting layer/electron transporting layer/cathode l) anode/light emitting layer/electron transporting layer/charge injecting layer/cathode m) anode/charge injecting layer/light emitting layer/electron transporting layer/charge injecting layer/cathode n) anode/charge injecting layer/hole transporting layer/light emitting layer/electron transporting layer/cathode o) anode/hole transporting layer/light emitting layer/electron transporting layer/charge injecting layer/cathode p) anode/charge injecting layer/hole transporting layer/light emitting layer/electron transporting layer/charge injecting layer/cathode As the specific examples of the charge injecting layer, there are exemplified layers containing an conducting polymer, layers which are disposed between an anode and a hole transporting layer and contain a material having an ionization potential between the ionization potential of an anode material and the ionization potential of a hole transporting material contained in the hole transporting layer, layers which are disposed between a cathode and an electron transporting layer and contain a material having an electron affinity between the electron affinity of a cathode material and the electron affinity of an electron transporting material contained in the electron transporting layer, and the like.

When the above-described charge injecting layer is a layer containing an conducting polymer, the electric conductivity of the conducting polymer is preferably $10^{-5}$ S/cm or more and $10^3$ S/cm or less, and for decreasing the leak current between light emitting pixels, more preferably $10^{-5}$ S/cm or more and $10^2$ S/cm or less, further preferably $10^{-5}$ S/cm or more and $10^1$ S/cm or less.

Usually, to provide an electric conductivity of the conducting polymer of $10^{-5}$ S/cm or more and $10^3$ S/cm or less, a suitable amount of ions are doped into the conducting polymer.

Regarding the kind of an ion doped, an anion is used in a hole injecting layer and a cation is used in an electron injecting layer. As examples of the anion, a polystyrene sulfonate ion, alkylbenzene sulfonate ion, camphor sulfonate ion and the like are exemplified, and as examples of the cation, a lithium ion, sodium ion, potassium ion, tetrabutyl ammonium ion and the like are exemplified.

The thickness of the charge injecting layer is for example, from 1 nm to 100 nm, preferably from 2 nm to 50 nm.

Materials used in the charge injecting layer may properly be selected in view of relation with the materials of electrode and adjacent layers, and there are exemplified conducting polymers such as polyaniline and derivatives thereof, polythiophene and derivatives thereof, polypyrrole and derivatives thereof, poly(phenylene vinylene) and derivatives thereof, poly(thienylene vinylene) and derivatives thereof, polyquinoline and derivatives thereof, polyquinoxaline and derivatives thereof, polymers containing aromatic amine structures in the main chain or the side chain, and the like, and metal phthalocyanine (copper phthalocyanine and the like), carbon and the like.

The insulation layer having a thickness of 2 nm or less has function to make charge injection easy. As the material of the above-described insulation layer, metal fluoride, metal oxide, organic insulation materials and the like are listed. As the polymer LED having an insulation layer having a thickness of 2 nm or less, there are listed polymer LEDs having an insulation layer having a thickness of 2 nm or less provided adjacent to a cathode, and polymer LEDs having an insulation layer having a thickness of 2 nm or less provided adjacent to an anode.

Specifically, there are listed the following structures q) to ab) for example.

q) anode/insulation layer having a thickness of 2 nm or less/light emitting layer/cathode r) anode/light emitting layer/insulation layer having a thickness of 2 nm or less/cathode s) anode/insulation layer having a thickness of 2 nm or less/light emitting layer/insulation layer having a thickness of 2 nm or less/cathode t) anode/insulation layer having a thickness of 2 nm or less/hole transporting layer/light emitting layer/cathode u) anode/hole transporting layer/light emitting layer/insulation layer having a thickness of 2 nm or less/cathode v) anode/insulation layer having a thickness of 2 nm or less/hole transporting layer/light emitting layer/insulation layer having a thickness of 2 nm or less/cathode.

w) anode/insulation layer having a thickness of 2 nm or less/light emitting layer/electron transporting layer/cathode x) anode/light emitting layer/electron transporting layer/insulation layer having a thickness of 2 nm or less/cathode y) anode/insulation layer having a thickness of 2 nm or less/light emitting layer/electron transporting layer/insulation layer having a thickness of 2 nm or less/cathode z) anode/insulation layer having a thickness of 2 nm or less/hole transporting layer/light emitting layer/electron transporting layer/cathode aa) anode/hole transporting layer/light emitting layer/electron transporting layer/insulation layer having a thickness of 2 nm or less/cathode ab) anode/insulation layer having a thickness of 2 nm or less/hole transporting layer/light emitting layer/electron transporting layer/insulation layer having a thickness of 2 nm or less/cathode In producing a polymer LED, when a film is formed from a solution by using such polymeric fluorescent substance soluble in an organic solvent, only required is removal of the solvent by drying after coating of this solution, and even in the case of mixing of a charge transporting material and a light emitting material, the same method can be applied, causing an extreme advantage in production. As the film forming method from a solution, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like.

Regarding the thickness of the light emitting layer, the optimum value differs depending on material used, and may properly be selected so that the driving voltage and the light emitting efficiency become optimum values, and for example, it is from 1 nm to 1 µm, preferably from 2 nm to 500 nm, further preferably from 5 nm to 200 nm.

In the polymer LED of the present invention, light emitting materials other than the above-described polymeric fluorescent substance can also be mixed in a light emitting layer. Further, in the polymer LED of the present invention, the light emitting layer containing light emitting materials other than the above-described polymeric fluorescent substance may also be laminated with a light emitting layer containing the above-described polymeric fluorescent substance.

As the light emitting material, known materials can be used. In a compound having lower molecular weight, there can be used, for example, naphthalene derivatives, anthracene or derivatives thereof, perylene or derivatives thereof; dyes such as polymethine dyes, xanthene dyes, coumarine dyes, cyanine dyes; metal complexes of 8-hydroxyquinoline or derivatives thereof, aromatic amine, tetraphenylcyclopentane or derivatives thereof, or tetraphenylbutadiene or derivatives thereof, and the like.

Specifically, there can be used known compounds such as those described in JP-A Nos. 57-51781, 59-195393 and the like, for example.

When the polymer LED of the present invention has a hole transporting layer, as the hole transporting materials used, there are exemplified polyvinylcarbazole or derivatives thereof, polysilane or derivatives thereof, polysiloxane derivatives having an aromatic amine in the side chain or the main chain, pyrazoline derivatives, arylamine derivatives, stilbene derivatives, triphenyldiamine derivatives, polyaniline or derivatives thereof, polythiophene or derivatives thereof, polypyrrole or derivatives thereof, poly(p-phenylenevinylene) or derivatives thereof, poly(2,5-thienylenevinylene) or derivatives thereof, or the like.

Specific examples of the hole transporting material include those described in JP-A Nos. 63-70257, 63-175860, 2-135359, 2-135361, 2-209988, 3-37992 and 3-152184.

Among them, as the hole transporting materials used in the hole transporting layer, preferable are polymer hole transporting materials such as polyvinylcarbazole or derivatives thereof, polysilane or derivatives thereof, polysiloxane derivatives having an aromatic amine compound group in the side chain or the main chain, polyaniline or derivatives thereof, polythiophene or derivatives thereof, poly(p-phenylenevinylene) or derivatives thereof, poly(2,5-thienylenevinylene) or derivatives thereof, or the like, and further preferable are polyvinylcarbazole or derivatives thereof, polysilane or derivatives thereof and polysiloxane derivatives having an aromatic amine compound group in the side chain or the main chain. In the case of a hole transporting material having lower molecular weight, it is preferably dispersed in a polymer binder for use.

Polyvinylcarbazole or derivatives thereof are obtained, for example, by cation polymerization or radical polymerization from a vinyl monomer.

As the polysilane or derivatives thereof, there are exemplified compounds described in Chem. Rev., 89, 1359 (1989) and GB 2300196 published specification, and the like. For synthesis, methods described in them can be used, and a Kipping method can be suitably used particularly.

As the polysiloxane or derivatives thereof, those having the structure of the above-described hole transporting material having lower molecular weight in the side chain or main chain, since the siloxane skeleton structure has poor hole transporting property. Particularly, there are exemplified those having an aromatic amine having hole transporting property in the side chain or main chain.

The method for forming a hole transporting layer is not restricted, and in the case of a hole transporting layer having lower molecular weight, a method in which the layer is formed from a mixed solution with a polymer binder is exemplified. In the case of a polymer hole transporting material, a method in which the layer is formed from a solution is exemplified.

The solvent used for the film forming from a solution is not particularly restricted providing it can dissolve a hole transporting material. As the solvent, there are exemplified chlorine solvents such as chloroform, methylene chloride, dichloroethane and the like, ether solvents such as tetrahydrofuran and the like, aromatic hydrocarbon solvents such as toluene, xylene and the like, ketone solvents such as acetone, methyl ethyl ketone and the like, and ester solvents such as ethyl acetate, butyl acetate, ethylcellosolve acetate and the like.

As the film forming method from a solution, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like, from a solution.

The polymer binder mixed is preferably that does not disturb charge transport extremely, and that does not have strong absorption of a visible light is suitably used. As such polymer binder, polycarbonate, polyacrylate, poly(methyl acrylate), poly(methyl methacrylate), polystyrene, poly(vinyl chloride), polysiloxane and the like are exemplified.

Regarding the thickness of the hole transporting layer, the optimum value differs depending on material used, and may properly be selected so that the driving voltage and the light emitting efficiency become optimum values, and at least a thickness at which no pin hole is produced is necessary, and too large thickness is not preferable since the driving voltage of the device increases. Therefore, the thickness of the hole transporting layer is, for example, from 1 nm to 1 μm, preferably from 2 nm to 500 nm, further preferably from 5 nm to 200 nm.

When the polymer LED of the present invention has an electron transporting layer, known compounds are used as the electron transporting materials, and there are exemplified oxadiazole derivatives, anthraquinonedimethane or derivatives thereof, benzoquinone or derivatives thereof, naphthoquinone or derivatives thereof, anthraquinone or derivatives thereof, tetracyanoanthraquinodimethane or derivatives thereof, fluorenone derivatives, diphenyldicyanoethylene or derivatives thereof, diphenoquinone derivatives, or metal complexes of 8-hydroxyquinoline or derivatives thereof, polyquinoline and derivatives thereof, polyquinoxaline and derivatives thereof, polyfluorene or derivatives thereof, and the like.

Specifically, there are exemplified those described in JP-A Nos. 63-70257, 63-175860, 2-135359, 2-135361, 2-209988, 3-37992 and 3-152184.

Among them, oxadiazole derivatives, benzoquinone or derivatives thereof, anthraquinone or derivatives thereof, or metal complexes of 8-hydroxyquinoline or derivatives thereof, polyquinoline and derivatives thereof, polyquinoxaline and derivatives thereof, polyfluorene or derivatives thereof are preferable, and 2-(4-biphenyl)-5-(4-t-butylphenyl)-1,3,4-oxadiazole, benzoquinone, anthraquinone, tris(8-quinolinol)aluminum and polyquinoline are further preferable.

The method for forming the electron transporting layer is not particularly restricted, and in the case of an electron transporting material having lower molecular weight, a vapor deposition method from a powder, or a method of film-forming from a solution or melted state is exemplified, and in the case of a polymer electron transporting material, a method of film-forming from a solution or melted state is exemplified, respectively.

The solvent used in the film-forming from a solution is not particularly restricted provided it can dissolve electron transporting materials and/or polymer binders. As the solvent, there are exemplified chlorine solvents such as chloroform, methylene chloride, dichloroethane and the like, ether solvents such as tetrahydrofuran and the like, aromatic hydrocarbon solvents such as toluene, xylene and the like, ketone solvents such as acetone, methyl ethyl ketone and the like, and ester solvents such as ethyl acetate, butyl acetate, ethylcellosolve acetate and the like.

As the film-forming method from a solution or melted state, there can be used coating methods such as a spin coating method, casting method, micro gravure coating method, gravure coating method, bar coating method, roll coating method, wire bar coating method, dip coating method, spray coating method, screen printing method, flexo printing method, offset printing method, inkjet printing method and the like.

The polymer binder to be mixed is preferably that which does not extremely disturb a charge transport property, and that does not have strong absorption of a visible light is suitably used. As such polymer binder, poly(N-vinylcarbazole), polyaniline or derivatives thereof, polythiophene or derivatives thereof, poly(p-phenylene vinylene) or derivatives thereof, poly(2,5-thienylene vinylene) or derivatives thereof, polycarbonate, polyacrylate, poly(methyl acrylate), poly(methyl methacrylate), polystyrene, poly(vinyl chloride), polysiloxane and the like are exemplified.

Regarding the thickness of the electron transporting layer, the optimum value differs depending on material used, and may properly be selected so that the driving voltage and the light emitting efficiency become optimum values, and at least a thickness at which no pin hole is produced is necessary, and too large thickness is not preferable since the driving voltage of the device increases. Therefore, the thickness of the electron transporting layer is, for example, from 1 nm to 1 μm, preferably from 2 nm to 500 nm, further preferably from 5 nm to 200 nm.

The substrate forming the polymer LED of the present invention may preferably be that does not change in forming an electrode and layers of organic materials, and there are exemplified glass, plastics, polymer film, silicon substrates and the like. In the case of a opaque substrate, it is preferable that the opposite electrode is transparent or semitransparent.

In the present invention, it is preferable that an anode is transparent or semitransparent, and as the material of this anode, electron conductive metal oxide films, semitransparent metal thin films and the like are used. Specifically, there are used indium oxide, zinc oxide, tin oxide, and films (NESA and the like) fabricated by using an electron conductive glass composed of indium.tin.oxide (ITO), indium.zinc.oxide and the like, which are metal oxide complexes, and gold, platinum, silver, copper and the like are used, and among them, ITO, indium.zinc.oxide, tin oxide are preferable. As the fabricating method, a vacuum vapor deposition method, sputtering method, ion plating method, plating method and the like are used. As the anode, there may also be used organic transparent conducting films such as polyaniline or derivatives thereof, polythiophene or derivatives thereof and the like.

The thickness of the anode can be appropriately selected while considering transmission of a light and electric conductivity, and for example, from 10 nm to 10 μm, preferably from 20 nm to 1 μm, further preferably from 50 nm to 500 nm.

Further, for easy charge injection, there may be provided on the anode a layer comprising a phthalocyanine derivative conducting polymers, carbon and the like, or a layer having an average film thickness of 2 nm or less comprising a metal oxide, metal fluoride, organic insulating material and the like.

As the material of a cathode used in the polymer LED of the present invention, that having lower work function is preferable. For example, there are used metals such as lithium, sodium, potassium, rubidium, cesium, beryllium, magnesium, calcium, strontium, barium, aluminum, scandium, vanadium, zinc, yttrium, indium, cerium, samarium, europium, terbium, ytterbium and the like, or alloys comprising two of more of them, or alloys comprising one or more of them with one or more of gold, silver, platinum, copper, manganese, titanium, cobalt, nickel, tungsten and tin, graphite or graphite intercalation compounds and the like. Examples of alloys include a magnesium-silver alloy, magnesium-indium alloy, magnesium-aluminum alloy, indium-silver alloy, lithium-aluminum alloy, lithium-magnesium alloy, lithium-indium alloy, calcium-aluminum alloy and the like. The cathode may be formed into a laminated structure of two or more layers.

The thickness of the cathode can be appropriately selected while considering transmission of a light and electric conductivity, and for example, from 10 nm to 10 μm, preferably from 20 nm to 1 μm, further preferably from 50 nm to 500 nm.

As the method for fabricating a cathode, there are used a vacuum vapor deposition method, sputtering method, lamination method in which a metal thin film is adhered under heat and pressure, and the like. Further, there may also be provided, between a cathode and an organic layer, a layer comprising an conducting polymer, or a layer having an average film thickness of 2 nm or less comprising a metal oxide, metal fluoride, organic insulation material and the like, and after fabrication of the cathode, a protective layer may also be provided which protects the polymer LED. For stable use of the polymer LED for a long period of time, it is preferable to provide a protective layer and/or protective cover for protection of the device in order to prevent it from outside damage.

As the protective layer, there can be used a polymer compound, metal oxide, metal fluoride, metal borate and the like. As the protective cover, there can be used a glass plate, a plastic plate the surface of which has been subjected to lower-water-permeation treatment, and the like, and there is suitably used a method in which the cover is pasted with an device substrate by a thermosetting resin or light-curing resin for sealing. If space is maintained using a spacer, it is easy to prevent an device from being injured. If an inner gas such as nitrogen and argon is sealed in this space, it is possible to prevent oxidation of a cathode, and further, by placing a desiccant such as barium oxide and the like in the above-described space, it is easy to suppress the damage of an device by moisture adhered in the production process. Among them, any one means or more are preferably adopted.

For obtaining light emission in plane form using the polymer LED of the present invention, an anode and a cathode in the plane form may properly be placed so that they are laminated each other. Further, for obtaining light emission in pattern form, there are a method in which a mask with a window in pattern form is placed on the above-described plane light emitting device, a method in which an organic layer in non-light emission part is formed to obtain extremely large thickness providing substantial non-light emission, and a method in which any one of an anode or a cathode, or both of them are formed in the pattern. By forming a pattern by any of these methods and by placing some electrodes so that independent on/off is possible, there is obtained a display device of segment type which can display digits, letters, simple marks and the like. Further, for forming a dot matrix device, it may be advantageous that anodes and cathodes are made in the form of stripes and placed so that they cross at right angles. By a method in which a plurality of kinds of polymeric fluorescent substances emitting different colors of lights are placed separately or a method in which a color filter or luminescence converting filter is used, area color displays and multi color displays are obtained. A dot matrix display can be driven by passive driving, or by active driving combined with TFT and the like. These display devices can be used as a display of a computer, television, portable terminal, portable telephone, car navigation, view finder of a video camera, and the like.

Further, the above-described light emitting device in plane form is a thin self-light-emitting one, and can be suitably used as a flat light source for back-light of a liquid crystal display, or as a flat light source for illumination. Further, if a flexible plate is used, it can also be used as a curved light source or a display.

EXAMPLES

The following examples further illustrate the present invention in detail but do not limit the scope thereof.

Here, regarding the weight-average molecular weight and number-average molecular weight, the polystyrene reduced average molecular weight was obtained by gel permeation chromatography (GPC) using chloroform as a solvent.

Example 1

9,9-dioctyl-2,7-dibromofluorene 0.77 g, 2,5-bis{2'-{4''-(N,N-diphenylamino)phenyl}ethenyl}-1,4-dibromobenzene 0.05, 2,2'-dipyridine 0.026 g, anhydrous nickel chloride 0.0217 g, triphenylphosphine 0.5 g and zinc dust 0.8 g were charged into a reaction vessel, then, the atmosphere in the reaction system was purged with argon gas. To this, 8.5 ml of N,N'-dimethylformamide (DMF) degassed beforehand by argon gas bubbling was added.

Then, the mixed solution was reacted at 80° C. for 25 hours. The reaction was performed in argon gas atmosphere. After the reaction, the solution was cooled and poured into methanol. Next, resulting precipitates were filtrated and collected. The precipitates were dried, then dissolved in chloroform. The solution was filtrated to remove insoluble materials, this solution was poured into methanol and resulting precipitates were collected. The precipitates were dried under reduced pressure to obtain a polymer 0.11 g. This polymer is referred to as polymeric fluorescent substance 1. The polystyrene reduced number average molecular weight of polymeric fluorescent substance 1 was $5 \times 10^3$.

From charging ratio of monomers, the ratio of the repeating units of formula (7) and formula (8) in polymeric fluorescent substance 1 is 95:5, and polymeric fluorescent substance 1 is a random copolymer.

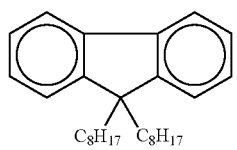

(7)

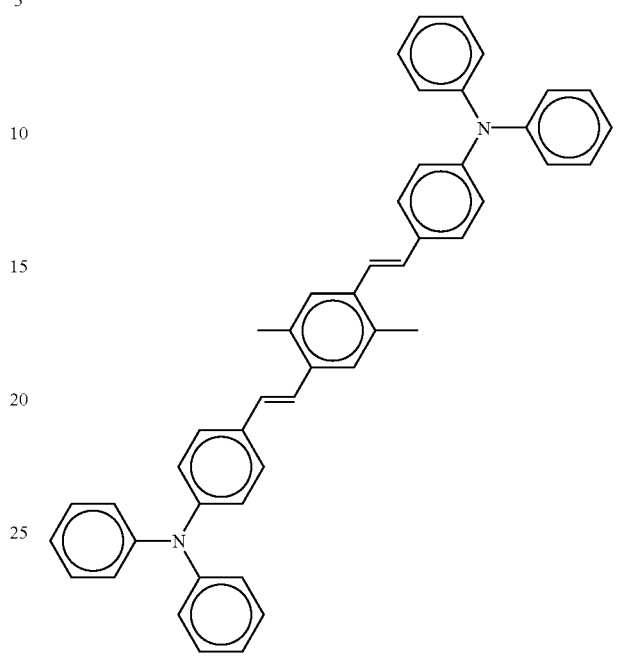

(8)

Example 2

9,9-dioctyl-2,7-dibromofluorene 0.548 g, 2-{4'-(N,N-diphenylamino)}phenyl-1,4-dichlorobenzene 0.39 g, 2,2'-dipyridine 0.624 g, 1,5-cyclooctadiene 0.866 g were charged into a reaction vessel, then, the atmosphere in the reaction system was purged with argon gas. To this, 20 ml of N,N'-dimethylformamide (DMF) degassed beforehand by argon gas bubbling was added.

Then, bis(1,5-cyclooctadiene)nickel (0) 1.10 g was added to the mixed solution, and it was reacted at 70° C. for 20 hours. The reaction was performed in argon gas atmosphere. After the reaction, the solution was cooled and poured into mixed solvent of methanol 25 ml/ion-exchanged water 50 ml containing 10 ml of 25% aqueous ammonia. Next, resulting precipitates were filtrated and collected.

The precipitates were dried, then dissolved in chloroform. The solution was filtrated to remove insoluble materials, then the solvent was removed under reduced pressure to collect resulting precipitates. The precipitates were washed with acetone and dried under reduced pressure to obtain a polymer 0.15 g. This polymer is referred to as polymeric fluorescent substance 2. The polystyrene reduced number average molecular weight of polymeric fluorescent substance 2 was $1.2 \times 10^4$.

From charging ratio of monomers, the ratio of the repeating units of formula (9) and formula (10) in polymeric fluorescent substance 2 is 50:50, and polymeric fluorescent substance 2 is a random copolymer.

(9)

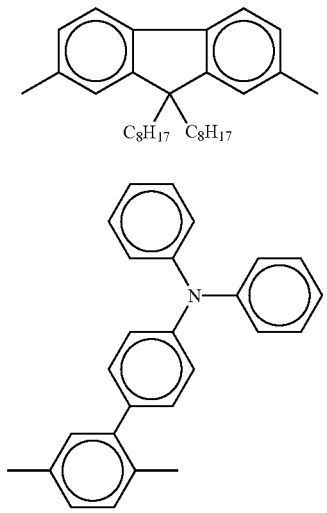

Example 3

9,9-dioctyl-2,7-dibromofluorene 0.79 g, 2-{2'-{4"-(N,N-diphenylamino)}phenyl}ethenyl}-1,4-dibromobenzene 0.081 g, 2,2'-dipyridine 0.558 g, 1,5-cyclooctadiene 0.432 g were charged into a reaction vessel, then, the atmosphere in the reaction system was purged with argon gas. To this, 20 ml of N,N'-dimethylformamide (DMF) degassed beforehand by argon gas bubbling was added.

Then, bis(1,5-cyclooctadiene)nickel (0) 0.96 g was added to the mixed solution, and it was reacted at 70° C. for 16 hours. The reaction was performed in argon gas atmosphere. After the reaction, the solution was cooled and poured into mixed solvent of methanol 25 ml/ion-exchanged water 50 ml containing 10 ml of 25% aqueous ammonia. Next, resulting precipitates were filtrated and collected.

The precipitates were dried, then dissolved in chloroform. The solution was filtrated to remove insoluble materials, then the solvent was removed under reduced pressure to collect resulting precipitates. The precipitates were washed with acetone and dried under reduced pressure to obtain a polymer 0.5 g. This polymer is referred to as polymeric fluorescent substance 3. The polystyrene reduced number average molecular weight of polymeric fluorescent substance 3 was $7.7 \times 10^3$.

From charging ratio of monomers, the ratio of the repeating units of formula (11) and formula (12) in polymeric fluorescent substance 3 is 90:10, and polymeric fluorescent substance 3 is a random copolymer.

(11)

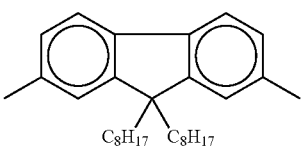

(12)

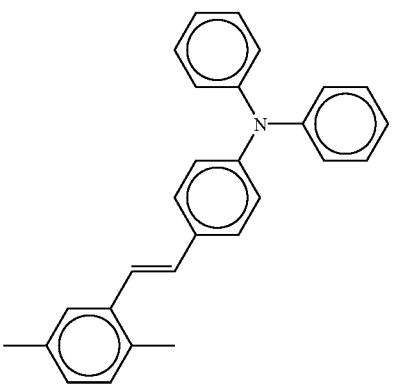

Example 4

9,9-dioctylfluorene-2,7-bis(ethylene boronate) 0.305 g(0.575 mmols), 2-{2'-{4"-(N,N-diphenylamino)phenyl}ethenyl}-1,4-dibromobenzene 0.309 g(0. 547 mmols) and aliquat336 (230 mg, 0.57 mmols) were dissolved in toluene (10 ml), and 10 ml of aqueous solution of potassium carbonate (240 mg, 1.7 mmols) was added to this. Further, tetrakis(triphenylphosphine)palladium (1.3 mg, 0.0011 mmols) was added and refluxed for 10 hours with heating. The organic layer was added to methanol dropwise, and deposited precipitates were filtrated. The obtained precipitates were dissolved in toluene, and added to methanol dropwise. The deposited precipitates were filtrated to obtain a polymer 0.25 g. This polymer is referred to as polymeric fluorescent substance 4. The polystyrene reduced number average molecular weight of polymeric fluorescent substance 4 is $1.8 \times 10^4$.

From charging ratio of monomers, the ratio of the repeating units of formula (13) and formula (14) in polymeric fluorescent substance 4 is 50:50, and polymeric fluorescent substance 4 is an alternating copolymer.

(13)

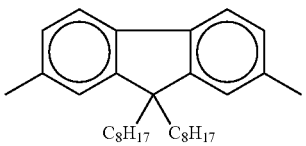

(14)

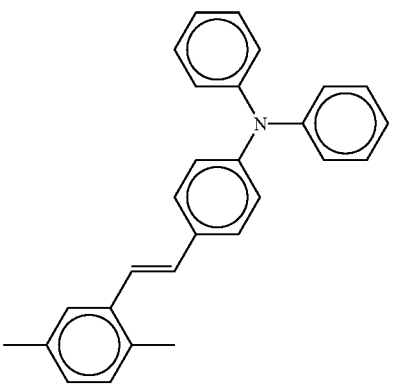

Example 5

9,9-dioctylfluorene-2,7-bis(ethylene boronate) 0.309 g(0.582 mmols), 9,9-dioctyl-2,7-dibromofluorene 0.274 g(0.499 mmols), 2-{2'-{4"-(N,N-diphenylamino)phenyl}ethenyl}-1,4-dibromobenzene 0.028 g(0.0554 mmols) and aliquat336 (230 mg, 0.57 mmols) were dissolved in toluene (10 ml), and 10 ml of aqueous solution of potassium carbonate (240 mg, 1.7 mmols) was added to this. Further, tetrakis(triphenylphosphine)palladium (1.3 mg, 0.0011 mmols) was added and refluxed for 10 hours with heating. The organic layer was added to methanol dropwise, and deposited precipitates were filtrated. The obtained precipitates were dissolved in toluene, and added to methanol dropwise. The deposited precipitates were filtrated to obtain a polymer 0.34 g. This polymer is referred to as polymeric fluorescent substance 5. The polystyrene reduced number average molecular weight of polymeric fluorescent substance 5 is $4.0 \times 10^4$.

From charging ratio of monomers, the ratio of the repeating units of formula (15) and formula (16) in polymeric fluorescent substance 5 is 95:5, and polymeric fluorescent substance 5 is a random copolymer consisting of the repeating units of formula (15) and formula (16). Here, the repeating unit of formula (15) inevitably exists next to the repeating unit of formula (16).

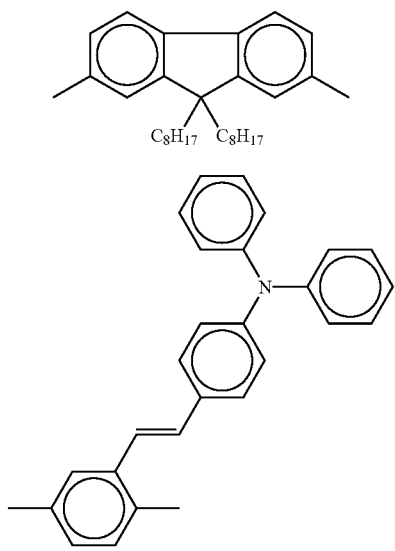

Example 6

9,9-dioctylfluorene-2,7-bis(ethylene boronate) 0.305 g(0.576 mmols), 9,9-dioctyl-2,7-dibromofluorene 0.271 g(0.494 mmols), 2,5-bis(3-(N-ethylcarbazolyl))-1,4-dibromobenzene 0.037 g(0.055 mmols) and aliquat336 (230 mg, 0.57 mmols) were dissolved in toluene (10 ml), and 10 ml of aqueous solution of potassium carbonate (240 mg, 1.7 mmols) was added to this. Further, tetrakis(triphenylphosphine)palladium (1.3 mg, 0.0011 mmols) was added and refluxed for 10 hours with heating. The organic layer was added to methanol dropwise, and deposited precipitates were filtrated. The obtained precipitates were dissolved in toluene, and added to methanol dropwise. The deposited precipitates were filtrated to obtain a polymer 0.32 g. This polymer is referred to as polymeric fluorescent substance 6. The polystyrene reduced number average molecular weight of polymeric fluorescent substance 6 is $3.1 \times 10^4$.

From charging ratio of monomers, the ratio of the repeating units of formula (17) and formula (18) in polymeric fluorescent substance 6 is 95:5, and polymeric fluorescent substance 6 is a random copolymer consisting of the repeating units of formula (17) and formula (18). Here, the repeating unit of formula (17) inevitably exists next to the repeating unit of formula (18).

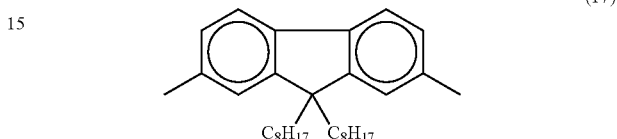

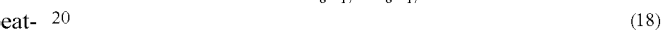

Example 7

9,9-dioctylfluorene-2,7-bis(ethylene boronate) 0.305 g(0.576 mmols), 2,5-bis{2'-{4"-(N,N-diphenylamino)phenyl}ethenyl}-1,4-dibromobenzene 0.424 g(0.548 mmols) and aliquat336 (230 mg, 0.57 mmols) were dissolved in toluene (10 ml), and 10 ml of aqueous solution of potassium carbonate (240 mg, 1.7 mmols) was added to this. Further, tetrakis(triphenylphosphine)palladium (1.3 mg, 0.0011 mmols) was added and refluxed for 10 hours with heating. The organic layer was added to methanol dropwise, and deposited precipitates were filtrated. The obtained precipitates were dissolved in toluene, and added to methanol dropwise. The deposited precipitates were filtrated to obtain a polymer 0.14 g. This polymer is referred to as polymeric fluorescent substance 7. The polystyrene reduced number average molecular weight of polymeric fluorescent substance 7 is $8.8 \times 10^4$.

From charging ratio of monomers, the ratio of the repeating units of formula (19) and formula (20) in polymeric fluorescent substance 7 is 50:50, and polymeric fluorescent substance 7 is an alternating copolymer.

(19)

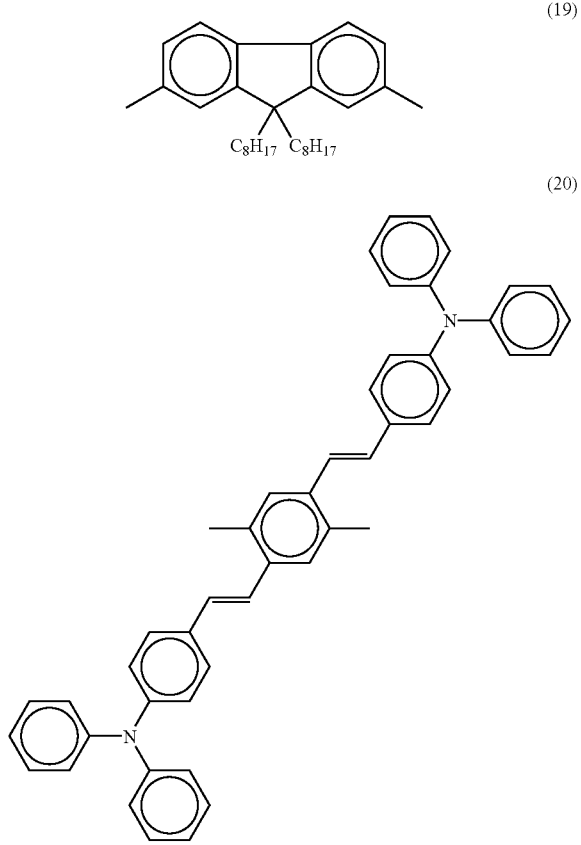

(20)

Comparative Example 1

9,9-dioctylfluorene-2,7-bis(ethylene boronate) 0.305 g(0.574 mmols), 9,9-dioctyl-2,7-dibromofluorene 0.300 g(0.547 mmols) and aliquat336 (230 mg, 0.57 mmols) were dissolved in toluene (10 ml), and 10 ml of aqueous solution of potassium carbonate (240 mg, 1.7 mmols) was added to this. Further, tetrakis(triphenylphosphine)palladium (1.3 mg, 0.0011 mmols) was added and refluxed for 10 hours with heating. The organic layer was added to methanol dropwise, and deposited precipitates were filtrated. The obtained precipitates were dissolved in toluene, and added to methanol dropwise. The deposited precipitates were filtrated to obtain a polymer 0.38 g. This polymer is referred to as polymeric fluorescent substance 8. The polystyrene reduced number average molecular weight of polymeric fluorescent substance 8 was $6.9 \times 10^4$. Polymeric fluorescent substance 8 is a polymer consisting of the repeating unit of formula (21).

(21)

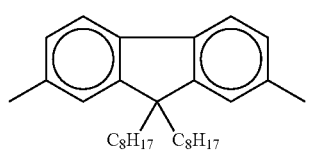

Comparative Example 2

9,9-dioctyl-2,7-dibromofluorene 0.548 g, 2-{(N-phenyl)-N-(3-dimetylphenyl)}amino-1,4-dichlorobenzene 0.328 g, 2,2'-dipyridine 0.624 g, 1,5-cyclooctadiene 0.866 g were charged into a reaction vessel, then, the atmosphere in the reaction system was purged with argon gas. To this, 20 ml of N,N'-dimethylformamide (DMF) degassed beforehand by argon gas bubbling was added.

Then, bis(1,5-cyclooctadiene)nickel (0) 1.10 g was added to the mixed solution, and it was reacted at 70° C. for 20 hours. The reaction was performed in argon gas atmosphere. After the reaction, the solution was cooled and poured into mixed solvent of methanol 25 ml/ion-exchanged water 50 ml containing 10 ml of 25% aqueous ammonia. Next, resulting precipitates were filtrated and collected.

The precipitates were dried, then dissolved in chloroform. The solution was filtrated to remove insoluble materials, then the solvent was removed under reduced pressure to collect resulting precipitates. The precipitates were washed with acetone and dried under reduced pressure to obtain a polymer 0.10 g. This polymer is referred to as polymeric fluorescent substance 9. The polystyrene reduced number average molecular weight of polymeric fluorescent substance 9 was $6.8 \times 10^3$.

From charging ratio of monomers, the ratio of the repeating units of formula (22) and formula (23) in polymeric fluorescent substance 9 is 50:50, and polymeric fluorescent substance 9 is a random copolymer.

(22)

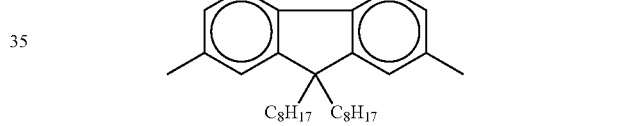

(23)

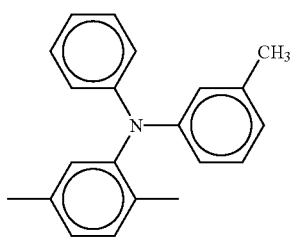

Comparative Example 3

9,9-dioctylfluorene-2,7-bis(ethylene boronate) 0.305 g(0.575 mmols), N,N-di(4-bromophenyl)-N-phenylamine 0.221 g(0.548 mmols) and aliquat336 (220 mg, 0.55 mmols) were dissolved in toluene (10 ml), and 10 ml of aqueous solution of potassium carbonate (238 mg, 1.7 mmols) was added to this. Further, tetrakis(triphenylphosphine)palladium (1.3 mg, 0.0011 mmols) was added and refluxed for 10 hours with heating. The organic layer was added to methanol dropwise, and deposited precipitates were filtrated. The obtained precipitates were dissolved in toluene, and added to methanol dropwise. The deposited precipitates were filtrated to obtain a polymer 0.21 g. This polymer is referred to as polymeric fluorescent substance 10. The polystyrene reduced number average molecular weight of polymeric fluorescent substance 10 is $3.7 \times 10^4$.

From charging ratio of monomers, the ratio of the repeating units of formula (24) and formula (25) in polymeric fluorescent substance 10 is 50:50, and polymeric fluorescent substance 10 is an alternating copolymer.

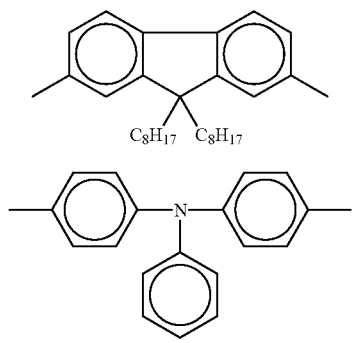

Example 10

Polymeric fluorescent substances 1-10 were soluble in a solvent, such as toluene and chloroform.

<Evaluation of Fluorescent Property>

A 0.4 wt % solution of polymeric fluorescent substance 1 in chloroform was spin-coated on a quarts plate to form a thin film of the polymeric fluorescent substance 1. The ultraviolet visible absorption spectrum and the fluorescent spectrum of this thin film were measured by using an ultraviolet visible absorption spectrophotometer (UV3500 manufactured by Hitachi Ltd.) and a fluorescent spectrophotometer (850 manufactured by Hitachi Ltd.), respectively. For calculation of fluorescent intensity, fluorescent spectrum when excited at 350 nm was used. The relative value of fluorescent intensity was calculated by dividing the area of fluorescent spectrum plotted against wave number on the abscissa by absorption at 350 nm.

As the same manner with the above, fluorescent spectra of polymeric fluorescence substances 2 to 10 in the thin film state were obtained.

The polymeric fluorescent substances 1 to 10 had fluorescent peak wavelength as shown Table 1. Each of polymeric fluorescent substances 1 to 8 and 10 had a strong fluorescence in visible region in the thin film state, but polymeric fluorescent substance 9 had a very weak fluorescence.

TABLE 1

Fluorescent characteristics of Polymeric fluorescent substance

| | Polymeric fluorescent substance | Fluorescent peak wavelength (nm) | Fluorescent strength (arbitrary unit) |
|---|---|---|---|
| Example 1 | Polymeric fluorescent substance 1 | 484 | 5.28 |
| Example 2 | Polymeric fluorescent substance 2 | 422 | 0.54 |
| Example 3 | Polymeric fluorescent substance 3 | 452 | 0.92 |
| Example 4 | Polymeric fluorescent substance 4 | 454 | 1.26 |
| Example 5 | Polymeric fluorescent substance 5 | 428 | 3.91 |
| Example 6 | Polymeric fluorescent substance 6 | 480 | 2.84 |
| Example 7 | Polymeric fluorescent substance 7 | 486 | 0.56 |
| Comparative Example 1 | Polymeric fluorescent substance 8 | 428 | 6.30 |
| Comparative Example 2 | Polymeric fluorescent substance 9 | 422 | 0.08 |
| Comparative Example 3 | Polymeric fluorescent substance 10 | 436 | 2.42 |

Example 11

<Production and Evaluation of the Device>

On a glass substrate on which an ITO film had been made at a thickness of 150 nm according to a sputtering method, a film having a thickness of 50 nm was formed using a solution (Baytron, manufactured by Bayer) of poly(ethylenedioxythiophene)/polystyrenesulfonic acid by spin coating, and the film was dried at 120° C. for 10 minutes on a hot plate. Next, polymeric fluorescent substance 1 were spin-coated using 1.5 wt % toluene solution, to form a film having a thickness of about 70 nm. Further, this film was dried at 80° C. for 1 hour under reduced pressure, then, lithium fluoride was vapor-deposited at 0.4 nm as a cathode buffer layer, calcium was vapor-deposited at 25 nm and aluminum was vapor-deposited at 40 nm as a cathode, to produce a polymer LED. In any vapor deposition, the degree of vacuum was 1 to $8 \times 10^{-6}$ Torr. Voltage was applied on the resulted device, to give EL light emission from Polymeric fluorescent substance 1. The intensity of EL light emission was approximately in proportion to the current density.

In the same manner, devices using polymeric fluorescent substances 6 and 8 were manufactured. By applying voltage on the resulted devices, EL light emissions from the polymeric fluorescent substances 6 and 8 were obtained, respectively. Intensity of EL light emissions was almost proportional to the current density.

The characteristics of the resulted device are shown in Table 2. Compared with polymeric fluorescent substance 8 of Comparative Example 1, both of polymeric fluorescent substance 1 of Example 1 and polymeric fluorescent substance 6 of Example 6 had higher light-emitting efficiency and maximum luminance, and also had a starting voltage of light emission of equivalent or lower value.

Although polymeric fluorescent substance 8 of Comparative Example 1 and polymeric fluorescent substance 10 of Comparative Example 3 had strong fluorescence (Table 1), when used for a device, the light emitting efficiency was low and the luminance was also low.

TABLE 2

Characteristics of Device using polymeric fluorescent substance

|  | Light emitting efficiency (cd/A) | Starting voltage of light emission (V) | Maximum luminance (cd/m$^2$) |
|---|---|---|---|
| polymeric fluorescent substance 1 | 0.89 | 3.5 | 3517 |
| polymeric fluorescent substance 7 | 0.48 | 4.6 | 4426 |
| polymeric fluorescent substance 8 | 0.09 | 4.6 | 749 |
| polymeric fluorescent substance 10 | 0.08 | 6.0 | 1041 |

Example 12

2,5-(2,7-dimetyl-octyloxy)-1,4-dibromobenzene 0.41 g, 2-{4'-(N,N-diphenylamino)}phenyl-1,4-dichlorobenzene 0.29 g, 2,2'-dipyridine 0.68 g were charged into a reaction vessel, then, the atmosphere in the reaction system was purged with argon gas. To this, 50 ml of tetrahydrofuran (dehydrated) degassed beforehand by argon gas bubbling was added.

Then, bis(1,5-cyclooctadiene)nickel (0) 1.2 g was added to the mixed solution, and it was reacted at 60° C. for 7 hours. The reaction was performed in argon gas atmosphere. After the reaction, the solution was cooled and poured into mixed solvent of methanol 100 ml/ion-exchanged water 100 ml. Next, resulting precipitates were filtrated and collected.

The precipitates were dried, then dissolved in toluene. The solution was filtered to remove insoluble materials, purified by silica gel charged column, then the solvent was removed under reduced pressure to collect resulting precipitates. The precipitates were washed with ethanol and dried under reduced pressure to obtain a polymer 0.05 g. This polymer is referred to as polymeric fluorescent substance 11. The polystyrene reduced number average molecular weight of polymeric fluorescent substance 11 was 2.1×10$^4$.

From charging ratio of monomers, the ratio of the repeating units of formula (26) and formula (27) in polymeric fluorescent substance 11 is 50:50, and polymeric fluorescent substance 11 is a random copolymer.

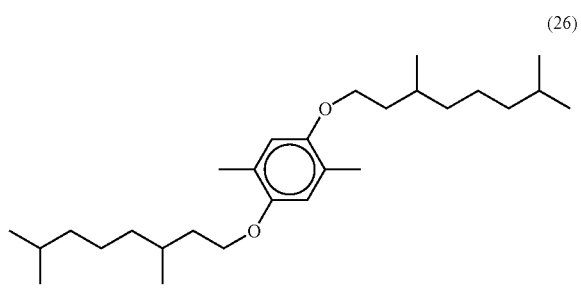

(26)

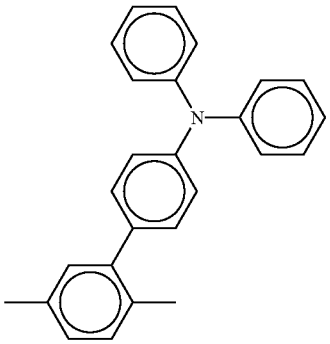

(27)

Comparative Example 4

2,5-(2,7-dimetyl-octyloxy)-1,4-dibromobenzene 0.41 g, 2-{N-(3-methylphenyl)-N-phenylamino}-1,4-dichlorobenzene 0.24 g, 2,2'-dipyridine 0.68 g were charged into a reaction vessel, then, the atmosphere in the reaction system was purged with argon gas. To this, 50 ml of tetrahydrofuran (dehydrated) degassed beforehand by argon gas bubbling was added.

Then, bis(1,5-cyclooctadiene)nickel (0) 1.2 g was added to the mixed solution, and it was reacted at 60° C. for 7 hours. The reaction was performed in argon gas atmosphere. After the reaction, the solution was cooled and poured into mixed solvent of methanol 100 ml/ion-exchanged water 100 ml. Next, resulting precipitates were filtrated and collected.

The precipitates were dried, then dissolved in toluene. The solution was filtered to remove insoluble materials, purified by silica gel charged column, then the solvent was removed under reduced pressure to collect resulting precipitates. The precipitates were washed with ethanol and dried under reduced pressure to obtain a polymer 0.05 g. This polymer is referred to as polymeric fluorescent substance 12. The polystyrene reduced number average molecular weight of polymeric fluorescent substance 12 was 6.6×10$^3$.

From charging ratio of monomers, the ratio of the repeating units of formula (28) and formula (29) in polymeric fluorescent substance 12 is 50:50, and polymeric fluorescent substance 12 is a random copolymer.

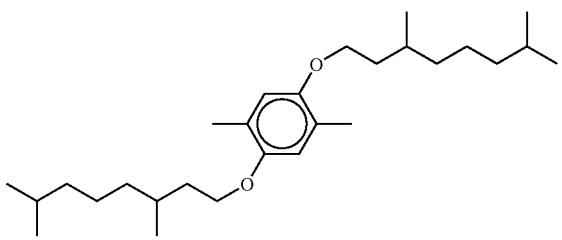

(28)

-continued

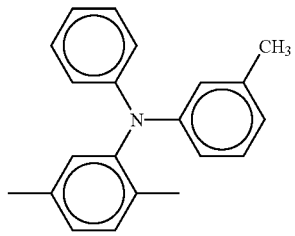

(29)

Example 13

As the same manner with example 10, fluorescent spectra of polymeric fluorescence substances 11 and 12 in the thin film state were obtained.

The polymeric fluorescent substances 11 had a strong fluorescence in visible region in the thin film state, but polymeric fluorescent substance 12 had a weaker fluorescence than polymeric fluorescent substance 11.

TABLE 3

Fluorescent characteristics of Polymeric fluorescent substance 2

| | Polymeric fluorescent substance | Fluorescent peak wavelength (nm) | Fluorescent strength (arbitrary unit) |
|---|---|---|---|
| Example 12 | Polymeric fluorescent substance 11 | 424 | 1.22 |
| Comparative example 4 | Polymeric fluorescent substance 12 | 428 | 0.46 |

The polymeric fluorescent substance of the present invention comprising a copolymer which has a substituent containing a specific aromatic amine structure in the side chain, shows high luminance and high light emitting efficiency when used for a light emitting layer of a polymer LED. Therefore, the polymer LED can be preferably used for apparatus, such as a light source having a flat or curved surface for lightning or as a back light of a liquid crystal display, a segment display, and a dot matrix flat-panel display.

What is claimed is:

1. A polymeric fluorescent substance exhibiting fluorescence in the solid state and having a polystyrene reduced number average molecular weight of $10^3$ to $10^8$, which is a random copolymer and comprises one or more repeating units represented by formula (1) and one or more repeating units represented by formula (3), —Ar$_1$—   (1)

wherein Ar$_1$ represents an arylene group or a divalent heterocyclic compound group and has 1 to 4 substituents, and wherein the substituents are represented by the following formula (2),

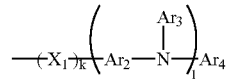

(2)

wherein X$_1$ represents a divalent hydrocarbon group; Ar$_2$ represents an arylene group or a divalent heterocyclic compound group; Ar$_3$ represents an aryl group or a monovalent heterocyclic compound group; Ar$_2$ and Ar$_3$ may be mutually connected to form a ring; Ar$_4$ represents an aryl group or a monovalent heterocyclic compound group; Ar$_3$ and Ar$_4$ may be mutually connected to form a ring; k is 0 or 1; l represents an integer of 1 to 3, —Ar$_5$—   (3)

wherein Ar$_5$ represents an arylene group or divalent heterocyclic compound group represented by formula (4) or (5):

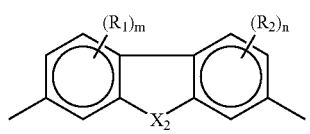

(4)

wherein X$_2$ represents a group selected from O, S, SO, SO$_2$, N—R$_3$, CR$_4$R$_5$, SiR$_6$R$_7$; R$_3$ to R$_7$ each independently represent a group selected from a hydrogen atom, alkyl group, aryl group and monovalent heterocyclic compound group; R$_1$ and R$_2$ each independently represent a group selected from alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group and cyano group; m and n are each independently integers of 0 to 3; when m is two or more, a plurality of R$_1$ may be the same or different; when n is two or more, a plurality of R$_2$ maybe the same or different; R$_1$ to R$_7$ may be connected to form a ring; when R$_1$ to R$_7$ is a group containing an alkyl chain, the alkyl chain may be interrupted by a group containing a hetero atom,

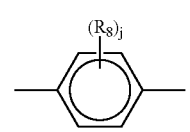

(5)

wherein R$_8$ represents a group selected from alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group and cyano group; j is an integer of 0 to 3; when j is two or more, a plurality of R$_8$ may be the same or different; when R$_8$ is a group containing an alkyl chain, the alkyl chain may be interrupted by a group containing a hetero atom.

2. The polymeric fluorescent substance according to claim 1 wherein the repeating unit of formula (3) is a repeating unit represented by formula (6):

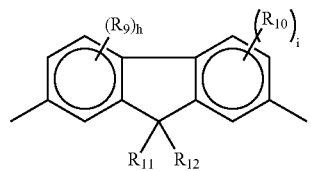

(6)

wherein $R_{11}$ and $R_{12}$ each independently represent a group selected from a hydrogen atom, alkyl group, aryl group and monovalent heterocyclic compound group; $R_9$ and $R_{10}$ each independently represent a group selected from alkyl group, alkoxy group, alkylthio group, alkylsilyl group, alkylamino group, aryl group, aryloxy group, arylsilyl group, arylamino group, arylalkyl group, arylalkoxy group, arylalkylsilyl group, arylalkylamino group, arylalkenyl group, arylalkynyl group, monovalent heterocyclic compound group and cyano group; h and i are each independently integers of 0 to 3; when h is two or more, a plurality of $R_9$ may be the same or different; when i is two or more, a plurality of $R_{10}$ maybe the same or different; $R_9$ to $R_{12}$ may be connected to form a ring; when $R_9$ to $R_{12}$ is a group containing an alkyl chain, the alkyl chain may be interrupted by a group containing a hetero atom.

3. A polymeric fluorescent substance according to claim 1, wherein the total amount of the repeating units represented by formulas (1) and (3) is 50% by mole or more based on all the repeating units, and the total amount of the repeating units represented by formula (1) is 0.1% by mole or more and 50% by mole or less based on the total amount of the repeating units represented by formulas (1) and (3).

4. A polymer light-emitting device comprising a pair of electrodes composed of an anode and a cathode at least one of which is transparent or semitransparent and at least containing an light emitting layer between the electrodes, wherein the light emitting layer comprises a polymeric fluorescent substance according to any one of claim 1 to 3.

5. A polymer light-emitting device according to claim 4, wherein a layer comprising a conductive polymer is disposed at least between one electrode and the light emitting layer such that the layer comprising a conductive polymer is adjacent to said electrode.

6. A polymer light-emitting device according to claim 4, wherein an insulation layer having a thickness of 2 nm or less is disposed at least between one electrode and the light emitting layer such that the insulation layer is adjacent to said electrode.

7. A polymer light-emitting device according to claim 4, wherein a layer comprising an electron-transporting compound is disposed between the cathode and the light emitting layer such that the layer comprising an electron-transporting compound is adjacent to said light-emitting layer.

8. A polymer light-emitting device according to claim 4, wherein a layer comprising a hole-transporting compound is disposed between the anode and the light emitting layer such that the layer comprising a hole-transporting compound is adjacent to said light-emitting layer.

9. A polymer light-emitting device according to claim 4, wherein a layer comprising an electron-transporting compound is disposed between the cathode and the light emitting layer such that the layer comprising an electron-transporting compound is adjacent to said light-emitting layer, and a layer comprising a hole-transporting compound is disposed between the anode and the light emitting layer such that the layer comprising a hole-transporting compound is adjacent to said light-emitting layer.

10. A flat light source comprising a polymer light-emitting device according to claim 4.

11. A segment display comprising a polymer light-emitting device according to claim 4.

12. A dot matrix display comprising a polymer light-emitting device according to claim 4.

13. A liquid crystal display comprising a polymer light-emitting device according to claim 4 as a back light.

14. A polymer light-emitting device according to claim 5, wherein a layer comprising an electron-transporting compound is disposed between the cathode and the light emitting layer such that the layer comprising an electron-transporting compound is adjacent to said light-emitting layer.

15. A polymer light-emitting device according to claim 5, wherein a layer comprising a hole-transporting compound is disposed between the anode and the light emitting layer such that the layer comprising a hole-transporting compound is adjacent to said light-emitting layer.

16. A polymer light-emitting device according to claim 5, wherein a layer comprising an electron-transporting compound is disposed between the cathode and the light emitting layer such that the layer comprising an electron-transporting compound is adjacent to said light-emitting layer, and a layer comprising a hole-transporting compound is disposed between the anode and the light emitting layer such that the layer comprising a hole-transporting compound is adjacent to said light-emitting layer.

17. A flat light source comprising a polymer light-emitting device according to claim 5.

18. A segment display comprising a polymer light-emitting device according to claim 5.

19. A dot matrix display comprising a polymer light-emitting device according to claim 5.

20. A liquid crystal display comprising a polymer light-emitting device according to claim 5 as a back light.

21. A polymer light-emitting device according to claim 6, wherein a layer comprising an electron-transporting compound is disposed between the cathode and the light emitting layer such that the layer comprising an electron-transporting compound is adjacent to said light-emitting layer.

22. A polymer light-emitting device according to claim 6, wherein a layer comprising a hole-transporting compound is disposed between the anode and the light emitting layer such that the layer comprising a hole-transporting compound is adjacent to said light-emitting layer.

23. A polymer light-emitting device according to claim 6, wherein a layer comprising an electron-transporting compound is disposed between the cathode and the light emitting layer such that the layer comprising an electron-transporting compound is adjacent to said light-emitting layer, and a layer comprising a hole-transporting compound is disposed between the anode and the light emitting layer such that the layer comprising a hole-transporting compound is adjacent to said light-emitting layer.

24. A flat light source comprising a polymer light-emitting device according to claim 6.

25. A segment display comprising a polymer light-emitting device according to claim 6.

26. A dot matrix display comprising a polymer light-emitting device according to claim 6.

27. A liquid crystal display comprising a polymer light-emitting device according to claim 6 as a back light.

* * * * *